US008170352B2

(12) United States Patent
Sandberg

(10) Patent No.: US 8,170,352 B2
(45) Date of Patent: May 1, 2012

(54) STRING SEARCHING FACILITY

(75) Inventor: Michael Stephen Sandberg, Vancouver (CA)

(73) Assignee: Sophos PLC, Abingdon (GB)

( * ) Notice: Subject to any disclaimer, the term of this patent is extended or adjusted under 35 U.S.C. 154(b) by 990 days.

(21) Appl. No.: 12/054,086

(22) Filed: Mar. 24, 2008

(65) Prior Publication Data

US 2009/0238474 A1  Sep. 24, 2009

(51) Int. Cl.
*G06K 9/62* (2006.01)
(52) U.S. Cl. ....................................................... 382/229
(58) Field of Classification Search .................. None
See application file for complete search history.

(56) References Cited

U.S. PATENT DOCUMENTS

| 5,469,354 | A | * | 11/1995 | Hatakeyama et al. | 1/1 |
| 5,706,496 | A | * | 1/1998 | Noguchi et al. | 1/1 |
| 5,884,033 | A | * | 3/1999 | Duvall et al. | 709/206 |
| 6,018,749 | A | * | 1/2000 | Rivette et al. | 715/202 |
| 6,338,061 | B1 | * | 1/2002 | Shimomura | 1/1 |
| 6,978,044 | B2 | * | 12/2005 | Akagi | 382/187 |
| 7,574,742 | B2 | * | 8/2009 | Yang et al. | 726/24 |
| 2001/0051941 | A1 | * | 12/2001 | Tonomura | 707/3 |
| 2004/0032986 | A1 | * | 2/2004 | Snapp | 382/217 |
| 2010/0199348 | A1 | * | 8/2010 | Sahni et al. | 726/23 |

* cited by examiner

*Primary Examiner* — Brian P Werner
(74) *Attorney, Agent, or Firm* — Strategic Patents, P.C.

(57) ABSTRACT

In embodiments of the present invention improved capabilities are described for scanning a data set for the presence of a target string. The data set may be received at a computing facility and cause a scanning program to execute. A first character pair in the data set may be identified where each character making up the first character pair is identified in a vector map. It may then be confirmed that the first character pair matches a positive indicated bitmask in a bitmap matrix, and verify that the position of the first character pair matches a position of a matching character pair in the target string. An action may be caused to be taken as a result of the verification.

18 Claims, 18 Drawing Sheets

212

CREATE CODE VECTOR
⑤

| BINARY VALUE: | 0 | 1 | 2... | 96 | 97 | 98 | 99 | 100 | 101 | 102 | 103 | 104... | 116 | 117 | 118 | 119... | 255 |
|---|---|---|---|---|---|---|---|---|---|---|---|---|---|---|---|---|---|
| CODE VECTOR: | -1 | -1 | -1 | -1 | 0 | 1 | 2 | 3 | 4 | -1 | 5 | 6 | 16 | -1 | -1 | -1 | -1 |

FIG. 5

CREATE BITMAP MATRIX ⑥

| | a_ | b_ | c_ | d_ | e_ | g_ | h_ | i_ | k_ | l_ | m_ | n_ | o_ | p_ | r_ | s_ | t_ |
|---|---|---|---|---|---|---|---|---|---|---|---|---|---|---|---|---|---|
| _a | 00 | 00 | 00 | 00 | 00 | 00 | 00 | 00 | 00 | 08 | 0C | 00 | 00 | 04 | 00 | 00 | 00 |
| _b | 00 | 00 | 00 | 02 | 00 | 00 | 00 | 00 | 00 | 00 | 00 | 00 | 00 | 00 | 00 | 00 | 00 |
| _c | 00 | 00 | 00 | 00 | 00 | 00 | 00 | 00 | 00 | 00 | 00 | 00 | 00 | 00 | 04 | 00 | 00 |
| _d | 01 | 00 | 00 | 00 | 08 | 00 | 00 | 00 | 00 | 00 | 00 | 00 | 00 | 00 | 00 | 00 | 00 |
| _e | 00 | 00 | 00 | 00 | 00 | 02 | 00 | 00 | 00 | 04 | 02 | 00 | 00 | 00 | 00 | 00 | 00 |
| _g | 00 | 00 | 08 | 00 | 00 | 00 | 00 | 00 | 00 | 00 | 00 | 00 | 00 | 00 | 00 | 00 | 00 |
| _h | 00 | 00 | 00 | 00 | 00 | 04 | 00 | 00 | 00 | 04 | 00 | 00 | 00 | 00 | 00 | 00 | 00 |
| _i | 00 | 00 | 00 | 00 | 00 | 00 | 00 | 00 | 00 | 00 | 00 | 00 | 02 | 04 | 00 | 00 | 00 |
| _k | 08 | 00 | 00 | 00 | 04 | 00 | 00 | 00 | 00 | 00 | 02 | 00 | 02 | 00 | 00 | 00 | 02 |
| _l | 00 | 04 | 00 | 00 | 00 | 00 | 02 | 00 | 00 | 00 | 08 | 02 | 00 | 00 | 00 | 00 | 00 |
| _m | 01 | 00 | 00 | 00 | 00 | 00 | 00 | 00 | 00 | 00 | 00 | 00 | 00 | 02 | 00 | 00 | 00 |
| _n | 00 | 00 | 00 | 00 | 00 | 00 | 00 | 08 | 00 | 00 | 00 | 00 | 00 | 00 | 00 | 00 | 00 |
| _o | 01 | 00 | 00 | 00 | 00 | 00 | 00 | 00 | 00 | 00 | 00 | 00 | 02 | 02 | 00 | 00 | 00 |
| _p | 00 | 00 | 00 | 00 | 00 | 00 | 00 | 08 | 00 | 00 | 00 | 00 | 00 | 00 | 00 | 00 | 00 |
| _r | 00 | 00 | 00 | 00 | 00 | 00 | 00 | 00 | 00 | 00 | 00 | 00 | 00 | 00 | 00 | 00 | 00 |
| _s | 00 | 00 | 00 | 00 | 00 | 00 | 00 | 00 | 00 | 00 | 00 | 00 | 00 | 00 | 00 | 00 | 00 |
| _t | 01 | 00 | 00 | 00 | 00 | 00 | 00 | 00 | 00 | 00 | 00 | 00 | 00 | 00 | 00 | 00 | 00 |

STRING SEARCHING FACILITY

BACKGROUND

1. Field

The present invention is related to data scanning, and more specifically relating to the searching of data for character string content.

2. Description of the Related Art

String searching, sometimes called string matching or pattern searching, attempts to identify occurrences where one of a plurality of character strings are found within a larger string or body of text. However, when the task is to search for a large number of strings, computational resources, such as time, processing capacity, and the like, may become prohibitively large, and the probability for false positives may increase. Therefore there exists a need for improved string searching methods that minimize the required computational resources, while maintaining a low rate of false positives.

SUMMARY

String searching may provide an automated way for a computer facility to examine data for content that is of some interest, such as content that could harm the computing facility, content that is not allowed due to some policy, content that is not allowed to be transferred, and the like. In addition, the application of a search string facility to the identification of target content may require the searching of a large number of strings, and this may in turn strain available computer resources in the execution of the string search. In embodiments, the present invention may provide time efficient string searching by minimizing the number of direct comparisons with actual target content through intelligent and systematic examination of data.

In embodiments, a plurality of target pattern strings may be received, where the target pattern strings may be of varying length. The minimum target pattern string length may be determined for the received plurality of target pattern strings. A plurality of truncated target pattern strings may be generated by truncating each of the received plurality of target pattern strings to the minimum target pattern string length through dropping leading characters from the target pattern strings. A truncated target pattern string character list may be generated from all characters contained in the plurality of truncated target pattern strings, where the truncated target pattern string character list may contain no repeating characters. A code vector list may be created that maps all possible binary character byte values to an assignment value, where each of the truncated target pattern string characters may be assigned a unique assignment value, and the rest of the possible binary character byte values may be assigned an assignment value that identifies it as not being a truncated target pattern string character.

In embodiments a bitmap matrix may be created that maps the location of truncated target pattern string character pairs in the plurality of truncated target pattern strings to bitmasks. Each bit in the bitmask may represent one location of a character pair in the truncated pattern strings, where "location" is the distance from the end of each pattern string. Each bitmask may thereby represent all locations of a given character pair in the truncated target pattern strings. A hash table may be created that maps the truncated target pattern strings to the plurality of target pattern strings, where there may be more than one possible target pattern string associated with each truncated target pattern string. A text file may be presented for target pattern string searching. A truncated target pattern string search may be performed on the text file, where the truncated target pattern string search utilizes the code vectors and the bitmap matrix to identify potential truncated target pattern string matches within the text file. Potential truncated target pattern strings may be compared in the searched text file to the target pattern strings. In embodiments, this step may provide for comparison of the potential truncated target pattern found in the text file to the truncated target pattern strings, as well as any subsequent comparison to the target pattern strings required as a result of multiple positive matches made to the truncated target pattern strings. And finally, any positive matches found during the string search may be reported, such as to a threat management facility.

In embodiments, scanning a data set for the presence of a target string may begin with receiving the data set at a computing facility and causing a scanning program to execute the following steps. (A) A first character pair in the data set may be identified where each character making up the first character pair is identified in a vector map. (B) Confirm that the first character pair matches a positive indicated bitmask in a bitmap matrix. (C) Verify that the position of the first character pair matches a position of a matching character pair in the target string may be verified. (D) And where an action may be caused to be taken as a result of the verification. In embodiments, repeating (A) prior to (D) may be provided to identify a second character pair wherein each character making up the second character pair is identified in a vector map. Repeating (B) prior to (D) may be further provided to confirm that the second character pair matches at least one bitmask identified in a bitmap matrix. And further, repeating (C) prior to (D) may be provided to verify that the position of the second character pair matches an expected position of a matching character pair in the target string. In embodiments, the first character pair may be located at a last end of a data segment in the data set. A second character pair may be identified prior to causing the action to be taken. In addition, the second character pair is identified by decrementing through the data segment.

In embodiments, the target string may be a truncated target string, where the truncated target string is only as long as the shortest of a plurality of target strings. The scanning of the data set may involve scanning for strings of data of a length not longer than the truncated target string. The action may be a hashing step to further verify that a data segment associated with the first character pair is a suspect data segment, an identification of the data set as a suspect data set, an identification of the data set as a suspect file, an identification of the data set as a targeted data set, and the like. The scanning program may be attempting to identify the data set as unwanted content, where the unwanted content is spam, malware, host intrusion prevention system (HIPS), an unwanted program, data being transmitted in violation of a confidentiality policy, and the like. In embodiments, the data set may be a file, application, in the form of streaming data that is to be analyzed, data stored in a temporary storage medium, data stored in a semi-permanent storage medium, data stored in long term memory, data stored in a database, and the like.

In embodiments, scanning a data set for the presence of a large number of target strings may begin with receiving the data set at a computing facility and causing a scanning program to execute the following steps a plurality of times to scan for the target strings throughout the data set. A first character pair in the data set may be identified where each character making up the first character pair is identified in a vector map. Confirm that the first character pair matches a positive indicated bitmask in a bitmap matrix. Verify that the position of the first character pair matches a position of a matching character pair in the target string. And where an action may be caused to be taken as a result of the verification.

In embodiments, scanning a data set for the presence of a large number of target strings may begin with intercepting the data set at a computing facility and causing a scanning program to execute the following steps. A first character pair in the data set may be identified where each character making up the first character pair is identified in a vector map. Confirm that the first character pair matches a positive indicated bitmask in a bitmap matrix may. Verify that the position of the first character pair matches a position of a matching character pair in the target string. And where an action may be caused to be taken as a result of the verification.

In embodiments, scanning a data set for the presence of a target string may begin with receiving the data set at a computing facility and causing a scanning program to execute the following steps. A first character pair in the data set may be identified where each character making up the first character pair is identified in a vector map. The vector map may contain characters representing each character of the target strings as truncated to be no larger than the shortest target string being scanned for. Confirm that the first character pair matches a positive indicated bitmask in a bitmap matrix. Verify that the position of the first character pair matches a position of a matching character pair in the target string. And where an action may be caused to be taken as a result of the verification.

In embodiments, a plurality of target pattern strings may be received, where the target pattern strings may be composed of at least one target pattern string character. A bitmap matrix may be created that maps the location of target pattern string character pairs in each of the plurality of target pattern strings. A data set may be presented for target pattern string searching. A target pattern string search may be performed on the data set, where the target pattern string search may utilize the bitmap matrix to identify target pattern string matches within the data set. Instances may be reported where a positive target pattern string match occurs.

In embodiments, the positive target pattern string match may be a match between at least one of the plurality of target pattern strings and a string in the data set. The target pattern string search may utilize a minimum target pattern string length. The minimum target pattern string length may set a search length in the target pattern string search. The search length may be associated with the number of characters skipped in the target pattern string search when no character match is found. The character match may be between at least one of the characters in at least one of the plurality of target pattern strings and a character found in the data set. The minimum target pattern string length may be used to generate a truncated target pattern string by truncating the target pattern string to the minimum target pattern string length. The truncated target pattern string list may be mapped to the plurality of target pattern strings, where the mapping utilizes a hash table.

In embodiments, the target pattern string search may employ a search pattern utilizing the bitmap matrix and a code vector, where a bitmask represents the location of target pattern character pairs associated with each possible pair combination of target pattern string characters. The code vector may be associated with a target pattern string character list. The target pattern string character list may contain all of the characters in the plurality of target pattern strings. The code vector may map at least one of the target pattern string characters of at least one of the plurality of target pattern strings to an assigned value. The search pattern may be associated with a search length, where the search pattern may increment forward through the data set by the search length when no character match is found. The search pattern may decrement backwards by one when a character match is found. The search pattern may compare the target pattern string character pair when two adjacent character matches are found. The search pattern may decrement backwards by one when a target pattern string character pair is found that matches at least one of the bitmap matrix bitmask indicated target pattern string character pair positions to the present pair position in the target pattern string search. The search pattern may then compare a found text string of the search length within the data set, which may have been found to match both core vectors for all characters within the search string and bitmask pair positions for all character pairs within the found search string, and the plurality of target search strings for a positive match.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures:

FIG. 5 depicts an example of a code vector, in an embodiment of the present invention.

FIG. 6 depicts an example of a bitmap matrix, in an embodiment of the present invention.

Figure 1:
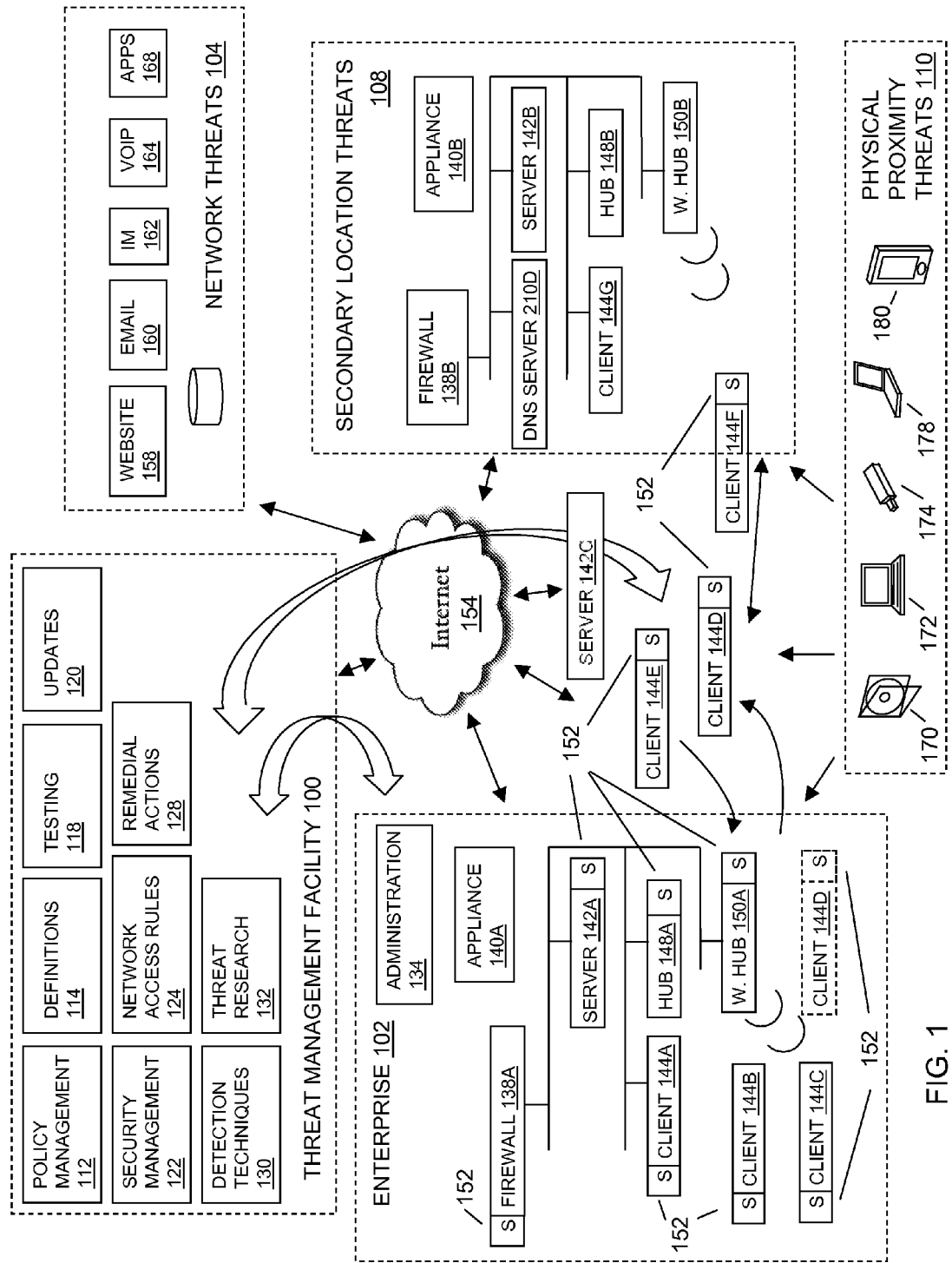
FIG. 1 depicts a block diagram of the threat management facility providing protection to an enterprise against a plurality of threats.

While the invention has been described in connection with certain preferred embodiments, other embodiments would be understood by one of ordinary skill in the art and are encompassed herein.

All documents referenced herein are hereby incorporated by reference.

DETAILED DESCRIPTION

An aspect of the present invention relates to corporate policy management and their implementation through a unified threat management facility 100. As will be explained in more detail below, a threat management facility 100 is used to protect computer assets from many threats, both computer generated threats and user generated threats. The threat management facility 100 is multi-dimensional in that it is designed to protect corporate assets from a variety of threats and it is adapted to learn about threats in one dimension (e.g. worm detection) and apply the knowledge in another dimension (e.g. spam detection). Corporate policy management is one of the dimensions for which the threat management facility can control. The corporation may institute a policy that prevents certain people (e.g. employees, groups of employees, types of employees, guest of the corporation, etc.) from accessing certain types of computer programs. For example, the corporation may elect to prevent its accounting department from using a particular version of an instant messaging service or all such services. In this example, the policy management facility 112 may be used to update the policies of all corporate computing assets with a proper policy control facility or it may update a select few. By using the threat management facility 100 to facilitate the setting, updating and control of such policies the corporation only needs to be concerned with keeping the threat management facility 100 up to date on such policies. The threat management facility 100 can take care of updating all of the other corporate computing assets.

It should be understood that the threat management facility 100 may provide multiple services and policy management may be offered as one of the services. We will now turn to a description of the threat management system 100.

Over recent years, malware has become a major problem across the internet 154. From both technical and user perspectives the categorization of a specific threat type, such as whether it is a virus, worm, spam, phishing exploration, spyware, adware, or the like, is becoming reduced in significance. The threat, no matter how it's categorized, may need to be stopped at all points of the enterprise facility 102, including laptop, desktop, server facility 142, gateway, and the like. Similarly, there may be less and less benefit to the user in having different solutions for known and unknown threats. As such, a consolidated threat management facility 100 may need to be applied to the same set of technologies and capabilities for all threats. The threat management facility 100 may provide a single agent on the desktop, and a single scan of any suspect file. This approach may eliminate the inevitable overlaps and gaps in protection caused by treating viruses and spyware as separate problems, while simultaneously simplifying administration and minimizing desktop load. As the number and range of types of threats has increased, so may have the level of connectivity available to all IT users. This may have lead to a rapid increase in the speed at which threats may move. Today, an unprotected PC connected to the internet 154 may be infected quickly, say within 10 minutes, which may require acceleration for the delivery of threat protection. Where once, monthly updates may have been sufficient, the threat management facility 100 may automatically and seamlessly update its product set against spam and virus threats quickly, for instance, every five minutes, every minute, continuously, or the like. Analysis and testing may be increasingly automated, and also may be performed more frequently; for instance, it may be completed in 15 minutes, and may do so without compromising quality. The threat management facility 100 may also extend techniques that may have been developed for virus and malware protection, and provide them to enterprise facility 102 network administrators to better control their environments. In addition to stopping malicious code, the threat management facility 100 may provide policy management that may be able to control legitimate applications, such as VoIP, instant messaging, peer-to-peer file-sharing, and the like, that may undermine productivity and network performance within the enterprise facility 102.

The threat management facility 100 may provide an enterprise facility 102 protection from computer-based malware, including viruses, spyware, adware, Trojans, intrusion, spam, policy abuse, uncontrolled access, and the like, where the enterprise facility 102 may be any entity with a networked computer-based infrastructure. In an embodiment, FIG. 1 may depict a block diagram of the threat management facility providing protection to an enterprise against a plurality of threats. The enterprise facility 102 may be corporate, commercial, educational, governmental, or the like, and the enterprise facility's 102 computer network may be distributed amongst a plurality of facilities, and in a plurality of geographical locations. The threat management facility 100 may include a plurality of functions, such as security management facility 122, policy management facility 112, update facility 120, definitions facility 114, network access rules facility 124, remedial action facility 128, detection techniques facility 130, testing facility 118, threat research facility 132, and the like. In embodiments, the threat protection provided by the threat management facility 100 may extend beyond the network boundaries of the enterprise facility 102 to include enterprise facility 102 client facility's 144 that have moved into network connectivity not directly associated or controlled by the enterprise facility 102. Threats to enterprise facility 102 client facilities 144 may come from a plurality of sources, such as from network threats 104, physical proximity threats 110, secondary location threats 108, and the like. In embodiments, the threat management facility 100 may provide an enterprise facility 102 protection from a plurality of threats to multiplatform computer resources in a plurality of locations and network configurations, with an integrated system approach.

In embodiments, the threat management facility 100 may be provided as a stand-alone solution. In other embodiments, the threat management facility 100 may be integrated into a third-party product. An application programming interface (e.g. a source code interface) may be provided such that the threat management facility 100 may be integrated. For instance, the threat management facility 100 may be stand-alone in that it provides direct threat protection to an enterprise or computer resource, where protection is subscribed to directly with the threat management facility 100. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may include a plurality of elements that provide protection from malware to enterprise facility 102 computer resources, including endpoint security and control, email security and control, web security and control, control of unauthorized users, control of guest and non-compliant computers, and the like. The security management facility 122 may be a software application that may provide malicious code and malicious application protection to a client facility 144 computing resource. The security management facility 122 may have the ability to scan the client facility 144 files for malicious code, remove or quarantine certain applications and files, prevent certain actions, perform remedial actions and perform other security measures. In embodiments, scanning the client facility 144 may include scanning some or all of the files stored to the client facility 144 on a periodic basis, may scan applications once the application has been requested to execute, may scan files as the files are transmitted to or from the client facility 144, or the like. The scanning of the applications and files may be to detect known malicious code or known unwanted applications. In an embodiment, new malicious code and unwanted applications may be continually developed and distributed, and updates to the known code database may be provided on a periodic basis, on a demand basis, on an alert basis, or the like.

In an embodiment, the security management facility 122 may provide for email security and control, where security management may help to eliminate spam, viruses, spyware and phishing, control of email content, and the like. The security management facilities 122 email security and control may protect against inbound and outbound threats, protect email infrastructure, prevent data leakage, provide spam filtering, and the like. In an embodiment, security management facility 122 may provide for web security and control, where security management may help to detect or block viruses, spyware, malware, unwanted applications, help control web browsing, and the like, which may provide comprehensive web access control enabling safe, productive web browsing. Web security and control may provide internet use policies, reporting on suspect devices, security and content filtering, active monitoring of network traffic, URI filtering, and the like. In an embodiment, the security management facility 122 may provide for network access control, which may provide control over network connections. Network control may stop unauthorized, guest, or non-compliant systems from accessing networks, and may control network traffic that may not be bypassed from the client level. In addition, network access control may control access to virtual private networks (VPN), where VPNs may be a communications network tunneled through another network, establishing a logical connection acting as a virtual network. In embodiments, a VPN may be treated in the same manner as a physical network.

In an embodiment, the security management facility 122 may provide for host intrusion prevention through behavioral based protection, which may guard against unknown threats by analyzing behavior before software code executes. Behavioral based protection may monitor code when it runs and intervene if the code is deemed to be suspicious or malicious. Advantages of behavioral based protection over runtime protection may include code being prevented from running, whereas runtime protection may only interrupt code that has already partly executed; behavioral protection may identify malicious code at the gateway or on the file servers and deletes it before reaching end-point computers; and the like.

In an embodiment, the security management facility 122 may provide for reputation filtering, which may target or identify sources of known malware. For instance, reputation filtering may include lists of URIs of known sources of malware or known suspicious IP addresses, or domains, say for spam, that when detected may invoke an action by the threat management facility 100, such as dropping them immediately. By dropping the source before any interaction can initiate, potential threat sources may be thwarted before any exchange of data can be made.

In embodiments, information may be sent from the enterprise back to a third party, a vendor, or the like, which may lead to improved performance of the threat management facility 100. For example, the types, times, and number of virus interactions that a client experiences may provide useful information for the preventions of future virus threats. This type of feedback may be useful for any aspect of threat detection. Feedback of information may also be associated with behaviors of individuals within the enterprise, such as being associated with most common violations of policy, network access, unauthorized application loading, unauthorized external device use, and the like. In embodiments, this type of information feedback may enable the evaluation or profiling of client actions that are violations of policy that may provide a predictive model for the improvement of enterprise policies.

In an embodiment, the security management facility 122 may provide for the overall security of the enterprise facility 102 network or set of enterprise facility 102 networks, may provide updates of malicious code information to the enterprise facility 102 network, and associated client facilities 144. The updates may be a planned update, an update in reaction to a threat notice, an update in reaction to a request for an update, an update based on a search of known malicious code information, or the like. The administration facility 134 may provide control over the security management facility 122 when updates are performed. The updates may be automatically transmitted without an administration facility's 134 direct control, manually transmitted by the administration facility 134, or the like. The security management facility 122 may include the management of receiving malicious code descriptions from a provider, distribution of malicious code descriptions to enterprise facility 102 networks, distribution of malicious code descriptions to client facilities 144, or the like. In an embodiment, the management of malicious code information may be provided to the enterprise facility's 102 network, where the enterprise facility's 102 network may provide the malicious code information through the enterprise facility's 102 network distribution system.

The threat management facility 100 may provide policy management facility 112 that may be able to block non-malicious applications, such as VoIP 164, instant messaging 162, peer-to-peer file-sharing, and the like, that may undermine productivity and network performance within the enterprise facility 102. The policy management facility 112 may be a set of rules or policies that may indicate enterprise facility 102 access permissions for the client facility 144, such as access permissions associated with the network, applications, external computer devices, and the like. The policy management facility 112 may include a database, a text file, a combination of databases and text files, or the like. In an embodiment, a policy database may be a block list, a black list, an allowed list, a white list, or the like that may provide a list of enterprise facility 102 external network locations/applications that may or may not be accessed by the client facility 144. The policy management facility 112 may include rules that may be interpreted with respect to an enterprise facility 102 network access request to determine if the request should be allowed. The rules may provide a generic rule for the type of access that may be granted; the rules may be related to the policies of an enterprise facility 102 for access rights for the enterprise facility's 102 client facility 144. For example, there may be a rule that does not permit access to sporting websites. When a website is requested by the client facility 144, a security facility may access the rules within a policy facility to determine if the requested access is related to a sporting website. In an embodiment, the security facility may analyze the requested website to determine if the website matches with any of the policy facility rules.

The policy management facility 112 may be similar to the security management facility 122 but with the distribution of enterprise facility 102 wide access rules and policies that may maintain control of the access of client facility 144 to enterprise facility 102 network resources. The policies may be defined for application type, subset of application capabilities, organization hierarchy, computer facility type, user type, network location, time of day, connection type, or the like. Policies may be maintained by the administration facility 134, through the threat management facility 100, in association with a third party, or the like. For example, a policy may restrict IM 162 activity to only support personnel for communicating with customers. This may allow communication for departments requiring access, but may maintain the network bandwidth for other activities by restricting the use of IM 162 to only the personnel that need access to IM 162 in support of the enterprise facility 102. In an embodiment, the policy management facility 112 may be a standalone application, may be part of the policy management facility 112 network server facility 142, may be part of the enterprise facility 102 network, may be part of the client facility 144, or the like.

In embodiments, the threat management facility 100 may provide configuration management, which may be similar to policy management, but may specifically examine the configuration set of applications, operating systems, hardware, and the like, and managing changes to their configurations. Assessment of a configuration may be made against a standard configuration policy, detection of configuration changes, remediation of improper configuration, application of new configurations, and the like. An enterprise may keep a set of standard configuration rules and policies which may represent the desired state of the device. For example, a client firewall may be running and installed, but in the disabled state, where remediation may be to enable the firewall. In another example, the enterprise may set a rule that disallows the use of USB disks, and sends a configuration change to all clients, which turns off USB drive access via a registry.

In embodiments, the threat management facility 100 may also provide for the removal of applications that may interfere with the operation of the threat management facility 100, such as competitor products that may also be attempting similar threat management functions. The removal of such products may be initiated automatically whenever such products are detected. In the case where such applications are services are provided indirectly through a third-party product, the application may be suspended until action is taken to remove or disable the third-party product's protection facility.

Threat management against a sometimes quickly evolving malware environment may require timely updates, and the update management facility 120 may be provided by the threat management facility 100. enterprise facility 102. In addition, a policy management facility 112 may also require update management (e.g. as provided by the update facility 120 herein described), as the enterprise facility 102 requirements for policies change enterprise facility 102 server facility 142 enterprise facility 102 client facility 144 server facility 142 enterprise facility 102. The update management for the security facility 122 and policy management facility 112 may be provided directly by the threat management facility 100, such as by a hosted system or in conjunction with the administration facility 134. In embodiments, the threat management facility 100 may provide for patch management, where a patch may be an update to an operating system, an application, a system tool, or the like, where one of the reasons for the patch is to reduce vulnerability to threats.

In embodiments, the security facility 122 and policy management facility 112 may push information to the enterprise facility 102 network and/or client facility 144, the enterprise facility 102 network and/or client facility 144 may pull information from the security facility 122 and policy management facility 112 network server facilities 142, there may be a combination of pushing and pulling of information between the security facility 122 and the policy management facility 112 network servers 142, enterprise facility 102 network, and client facilities 144, or the like. For example, the enterprise facility 102 network and/or client facility 144 may pull information from the security facility 122 and policy management facility 112 network server facility 142 may request the information using the security facility 122 and policy management facility 112 update module; the request may be based on a certain time period, by a certain time, by a date, on demand, or the like. In another example, the security facility 122 and policy management facility 112 network servers 142 may push the information to the enterprise facility's 102 network and/or client facility 144 by providing notification that there are updates available for download and then transmitting the information. The combination of the security management 122 network server facility 142 and security update module may function substantially the same as the policy management facility 112 network server and policy update module by providing information to the enterprise facility 102 network and the client facility 144 in a push or pull method. In an embodiment, the policy management facility 112 and the security facility 122 management update modules may work in concert to provide all the needed information to the enterprise facility's 102 network and/or client facility 144 for control of application execution. In an embodiment, the policy update module and security update module may be combined into a single update module.

As threats are identified and characterized, the threat management facility 100 may create definition updates that may be used to allow the threat management facility 100 to detect and remediate the latest malicious software, unwanted applications, configuration and policy changes, and the like. The threat definition facility 114 may contain threat identification updates, also referred to as definition files. A definition file may be a virus identity file that may include definitions of known or potential malicious code. The IDE definition files may provide information that may identify malicious code within files, applications, or the like. The definition files may be accessed by security management facility 122 when scanning files or applications within the client facility 144 for the determination of malicious code that may be within the file or application. The definition files may contain a number of commands, definitions, or instructions, to be parsed and acted upon, or the like. In embodiments, the client facility 144 may be updated with new definition files periodically to provide the client facility 144 with the most recent malicious code definitions; the updating may be performed on a set time period, may be updated on demand from the client facility 144, may be updated on demand from the network, may be updated on a received malicious code alert, or the like. In an embodiment, the client facility 144 may request an update to the definition files from an update facility 120 within the network, may request updated definition files from a computing facility external to the network, updated definition files may be provided to the client facility 114 from within the network, definition files may be provided to the client facility 144 from an external computing facility from an external network, or the like.

In an embodiment, a definition management facility 114 may provide for the timely updates of definition files information to the network, client facilities 144, and the like. New and altered malicious code and malicious applications may be continually created and distributed to networks worldwide. The definition files that maintain the definitions of the malicious code and malicious application information for the protection of the networks and client facilities 144 may need continual updating to provide continual defense of the network and client facility 144 from the malicious code and malicious applications. The definition files management may provide for automatic and manual methods of updating the definition files. In embodiments, the network may receive definition files and distribute the definition files to the network client facilities 144, the client facilities 144 may receive the definition files directly, or the network and client facilities 144 may both receive the definition files, or the like. In an embodiment, the definition files may be updated on a fixed periodic basis, on demand by the network and/or the client facility 144, as a result of an alert of a new malicious code or malicious application, or the like. In an embodiment, the definition files may be released as a supplemental file to an existing definition files to provide for rapid updating of the definition files.

In a similar manner, the security management facility 122 may be used to scan an outgoing file and verify that the outgoing file is permitted to be transmitted per the enterprise facility 102 rules and policies. By checking outgoing files, the security management facility 122 may be able discover malicious code infected files that were not detected as incoming files as a result of the client facility 144 having been updated with either new definition files or policy management facility 112 information. The definition files may discover the malicious code infected file by having received updates of developing malicious code from the administration facility 134, updates from a definition files provider, or the like. The policy management facility 112 may discover the malicious code infected file by having received new updates from the administration facility 134, from a rules provider, or the like.

The threat management facility 100 may provide for a way to control access to the enterprise facility 102 networks. For instance, the enterprise facility 102 may want to restrict access to certain applications, networks, files, printers, servers, databases, or the like. In addition, the enterprise facility 102 may want to restrict user access under certain conditions, such as the user's location, usage history, need to know, job position, connection type, time of day, method of authentication, client-system configuration, or the like. Network access rules may be developed by the enterprise facility 102, or pre-packaged by a supplier, and managed by the threat management facility 100 in conjunction with the administration facility 134. Network access rules and control may be responsible for determining if a client facility 144 application should be granted access to a requested network location. The network location may be on the same network as the facility or may be on another network. In an embodiment, the network access control may verify access rights for client facilities 144 from within the network or may verify access rights of computer facilities from external networks. When network access for a client facility 144 is denied, the network access control may send an information file to the client facility 144, the information file may contain data or commands that may provide instructions for the remedial action facility 128. The information sent by the network access facility 124 control may be a data file. The data file may contain a number of commands, definitions, instructions, or commands to be parsed and acted upon through the remedial action facility 128, or the like. The information sent by the network access facility 124 control may be a command or command file that the remedial action facility 128 may access and take action upon.

In an embodiment, the network access rules 124 may provide an information store to be accessed by the network access control. The network access rules facility 124 may include databases such as a block list, a black list, an allowed list, a white list, an unacceptable network site database, an acceptable network site database, a network site reputation database, or the like of network access locations that may or may not be accessed by the client facility 144. Additionally, the network access rules facility 124 may incorporate rule evaluation; the rule evaluation may parse network access requests and apply the parsed information to network access rules. The network access rule facility 124 may have a generic set of rules that may be in support of an enterprise facility's 102 network access policies, such as denying access to certain types of websites 158, controlling instant messenger 162 accesses, or the like. Rule evaluation may include regular expression rule evaluation, or other rule evaluation method for interpreting the network access request and comparing the interpretation to the established rules for network access. In an embodiment, the network access rules facility 124 may receive a rules evaluation request from the network access control and may return the rules evaluation to the network access control.

Similar to the threat definitions facility 114, the network access rule facility 124 may provide updated rules and policies to the network access rules facility 124. The network access rules facility 124 may be maintained by the network administration facility 134 using the network access rules facility 124 management. In an embodiment, the network administration facility 134 may be able to maintain a set of access rules manually by adding rules, changing rules, deleting rules, or the like. Additionally, the administration facility 134 may be able to retrieve predefined rule sets from a provider that may provide a set of rules to be applied to an entire enterprise facility 102. The network administration facility 134 may be able to modify the predefined rules as needed for a particular enterprise facility 102 using the network access rules facility 124 management.

When a threat or policy violation is detected by the threat management facility 100, the threat management facility 100 may provide for a remedial action facility 128. Remedial action may take a plurality of forms, such as terminating or modifying an ongoing process or interaction, sending a warning to a client or administration facility 134 of an ongoing process or interaction, executing a program or application to remediate against a threat or violation, record interactions for subsequent evaluation, or the like. Remedial action may be associated with an application that responds to information that a client facility 144 network access request has been denied. In an embodiment, when the data file is received, remedial action may parse the data file, interpret the various aspects of the data file, and act on the parsed data file information to determine actions to be taken on an application requesting access to a denied network location. In an embodiment, when the data file is received, remedial action may access the threat definitions to parse the data file and determine an action to be taken on an application requesting access to a denied network location. In an embodiment, the information received from the facility may be a command or a command file. The remedial action facility may carry out any commands that are received or parsed from a data file from the facility without performing any interpretation of the commands. In an embodiment, the remedial action facility may interact with the received information and may perform various actions on a client requesting access to a denied network location. The action may be one or more of continuing to block all requests to a denied network location, a malicious code scan on the application, a malicious code scan on the client facility 144, quarantine of the application, terminating the application, isolation of the application, isolation of the client facility 144 to a location within the network that restricts network access, blocking a network access port from a client facility 144, reporting the application to a administration facility 134, or the like.

Remedial action may be provided as a result of a detection of a threat or violation. The detection techniques facility 130 may include monitoring the enterprise facility 102 network or end-point devices, such as by monitoring streaming data through the gateway, across the network, through routers and hubs, and the like. The detection techniques facility 130 may include monitoring activity and stored files on computing facilities, such as on server facilities 142, desktop computers, laptop computers, other mobile computing devices, and the like. Detection techniques, such as scanning a computer's stored files, may provide the capability of checking files for stored threats, either in the active or passive state. Detection techniques, such as streaming file management, may provide the capability of checking files received at the network, gateway facility, client facility 144, and the like. This may provide the capability of not allowing a streaming file or portions of the streaming file containing malicious code from entering the client facility 144, gateway facility, or network. In an embodiment, the streaming file may be broken into blocks of information, and a plurality of virus identities may be used to check each of the blocks of information for malicious code. In an embodiment, any blocks that are not determined to be clear of malicious code may not be delivered to the client facility 144, gateway facility, or network.

Verifying that the threat management facility 100 is detecting threats and violations to established policy, may require the ability to test the system, either at the system level or for a particular computing component. The testing facility 118 may allow the administration facility 134 to coordinate the testing of the security configurations of client facility 144 computing facilities on a network. The administration facility 134 may be able to send test files to a set of client facility 144 computing facilities to test the ability of the client facility 144 to determine acceptability of the test file. After the test file has been transmitted, a recording facility may record the actions taken by the client facility 144 in reaction to the test file. The recording facility may aggregate the testing information from the client facility 144 and report the testing information to the administration facility 134. The administration facility 134 may be able to determine the level of preparedness of the client facility 144 computing facilities by the reported information. Remedial action may be taken for any of the client facility 144 computing facilities as determined by the administration facility 134; remedial action may be taken by the administration facility 134 or by the user of the client facility 144.

The threat research facility 132 may provide a continuously ongoing effort to maintain the threat protection capabilities of the threat management facility 100 in light of continuous generation of new or evolved forms of malware. Threat research may include researchers and analysts working on known and emerging malware, such as viruses, rootkits a spyware, as well as other computer threats such as phishing, spam, scams, and the like. In embodiments, through threat research, the threat management facility 100 may be able to provide swift, global responses to the latest threats.

The threat management facility 100 may provide threat protection to the enterprise facility 102, where the enterprise facility 102 may include a plurality of networked components, such as client facility 144, server facility 142, DNS server facility 210, administration facility 134, firewall 138, gateway, hubs 148, routers, threat management appliance 140, desktop users, mobile users, and the like. In embodiments, it may be the end-point computer security facility 152, located on a computer's desktop, which may provide threat protection to a user, and associated enterprise facility 102. In embodiments, the term end-point may refer to a computer system that may source data, receive data, evaluate data, buffer data, or the like, such as a user's desktop computer as an end-point computer, a firewall as a data evaluation end-point computer system, a laptop as a mobile end-point computer, a PDA as a hand-held end-point computer. In embodiments, end-point may refer to a source or destination for data, including such components where the destination is characterized by an evaluation point for data, and where the data may be sent to a subsequent destination after evaluation. The end-point computer security facility 152 may be an application loaded onto the computer platform or computer support component, where the application may accommodate the plurality of computer platforms and/or functional requirements of the component. For instance, a client facility 144 computer may be one of a plurality of computer platforms, such as Windows, Macintosh, Linux, and the like, where the end-point computer security facility 152 may be adapted to the specific platform, while maintaining a uniform product and product services across platforms. Additionally, components may have different functions to serve within the enterprise facility's 102 networked computer-based infrastructure. For instance, computer support components provided as hubs 148, routers, server facility 142, DNS server facility 210, firewalls 138, and the like, may require unique security application software to protect their portion of the system infrastructure, while providing an element in an integrated threat management system that extends out beyond the threat management facility 100 to incorporate all computer resources under its protection.

The enterprise facility 102 may include a plurality of client facility 144 computing platforms on which the end-point computer security facility 152 is adapted. A client facility 144 computing platform may be a computer system that is able to access a service on another computer, such as a server facility 142, via a network. This client facility 144 server facility 142 model may apply to a plurality of networked applications, such as a client facility 144 connecting to an enterprise facility 102 application server facility 142, a web browser client facility 144 connecting to a web server facility 142, an e-mail client facility 144 retrieving e-mail from an internet 154 service provider's mail storage servers 142, and the like. In embodiments, traditional large client facility 144 applications may be switched to websites, which may increase the browser's role as a client facility 144. Clients 144 may be classified as a function of the extent to which they perform their own processing. For instance, client facilities 144 are sometimes classified as a fat client facility 144 or thin client facility 144. The fat client facility 144, also known as a thick client facility 144 or rich client facility 144, may be a client facility 144 that performs the bulk of data processing operations itself, and does not necessarily rely on the server facility 142. The fat client facility 144 may be most common in the form of a personal computer, where the personal computer may operate independent of any server facility 142. Programming environments for fat clients 144 may include Curl, Delphi, Droplets, Java, win32, X11, and the like. Thin clients 144 may offer minimal processing capabilities, for instance, the thin client facility 144 may primarily provide a graphical user interface provided by an application server facility 142, which may perform the bulk of any required data processing. Programming environments for thin clients 144 may include JavaScript/AJAX, ASP, JSP, Ruby on Rails, Python's Django, PHP, and the like. The client facility 144 may also be a mix of the two, such as processing data locally, but relying on a server facility 142 for data storage. As a result, this hybrid client facility 144 may provide benefits from both the fat client facility 144 type, such as multimedia support and high performance, and the thin client facility 144 type, such as high manageability and flexibility. In embodiments, the threat management facility 100, and associated end-point computer security facility 152, may provide seamless threat protection to the plurality of clients 144, and client facility 144 types, across the enterprise facility 102.

The enterprise facility 102 may include a plurality of server facility 142, such as application servers 142, communications servers 142, file servers 142, database servers 142, proxy servers 142, mail servers 142, fax servers 142, game servers 142, web servers 142, and the like. A server facility 142, which may also be referred to as a server facility 142 application, server facility 142 operating system, server facility 142 computer, or the like, may be an application program or operating system that accepts client facility 144 connections in order to service requests from clients 144. The server facility 142 application may run on the same computer as the client facility 144 using it, or the server facility 142 and the client facility 144 may be running on different computers and communicating across the network. Server facility 142 applications may be divided among server facility 142 computers, with the dividing depending upon the workload. For instance, under light load conditions all server facility 142 applications may run on a single computer and under heavy load conditions a single server facility 142 application may run on multiple computers. In embodiments, the threat management facility 100 may provide threat protection to server facilities 142 within the enterprise facility 102 as load conditions and application changes are made.

A server facility 142 may also be an appliance facility 140, where the appliance facility 140 provides specific services onto the network. Though the appliance facility 140 is a server facility 142 computer, that may be loaded with a server facility 142 operating system and server facility 142 application, the enterprise facility 102 user may not need to configure it, as the configuration may have been performed by a third party. In an embodiment, an enterprise facility 102 appliance may be a server facility 142 appliance that has been configured and adapted for use with the threat management facility 100, and located within the facilities of the enterprise facility 102. The enterprise facility's 102 threat management appliance may enable the enterprise facility 102 to administer an on-site local managed threat protection configuration, where the administration facility 134 may access the threat resources through an interface, such as a web portal. In an alternate embodiment, the enterprise facility 102 may be managed remotely from a third party, vendor, or the like, without an appliance facility 140 located within the enterprise facility 102. In this instance, the appliance functionality may be a shared hardware product between pluralities of enterprises 102. In embodiments, the appliance facility 140 may be located at the enterprise facility 102, where the enterprise facility 102 maintains a degree of control. In embodiments, a hosted service may be provided, where the appliance 140 may still be an on-site black box to the enterprise facility 102, physically placed there because of infrastructure requirements, but managed by a third party, vendor, or the like.

Simple server facility 142 appliances may also be utilized across the enterprise facility's 102 network infrastructure, such as switches, routers, wireless routers, hubs 148, gateways, print servers 142, net modems, and the like. These simple server facility appliances may not require configuration by the enterprise facility 102, but may require protection from threats via an end-point computer security facility 152. These appliances may provide interconnection services within the enterprise facility 102 network, and therefore may advance the spread of a threat if not properly protected.

One way for a client facility 144 to be protected from threats from within the enterprise facility 102 network may be a personal firewall. A personal firewall may be an application that controls network traffic to and from a client, permitting or denying communications based on a security policy. Personal firewalls may be designed for use by end-users, which may result in protection for only the computer on which it's installed. Personal firewalls may be able to control network traffic by providing prompts each time a connection is attempted and adapting security policy accordingly. Personal firewalls may also provide some level of intrusion detection, which may allow the software to terminate or block connectivity where it suspects an intrusion is being attempted. Other features that may be provided by a personal firewall may include alerts about outgoing connection attempts, control of program access to networks, hiding the client from port scans by not responding to unsolicited network traffic, monitoring of applications that may be listening for incoming connections, monitoring and regulation of incoming and outgoing network traffic, prevention of unwanted network traffic from installed applications, reporting applications that make connection attempts, reporting destination servers with which applications may be attempting communications, and the like. In embodiments, the personal firewall may be provided by the treat management facility 100.

Another important component that may be protected by an end-point computer security facility 152 is a network firewall facility 138, which may be a hardware or software device that may be configured to permit, deny, or proxy data through a computer network that has different levels of trust in its source of data. For instance, an internal enterprise facility 102 network may have a high level of trust, because the source of all data has been sourced from within the enterprise facility 102. An example of a low level of trust is the Internet 154, because the source of data may be unknown. A zone with an intermediate trust level, situated between the Internet 154 and a trusted internal network, may be referred to as a "perimeter network". Since firewall facilities 138 represent boundaries between threat levels, the end-point computer security facility 152 associated with the firewall facility 138 may provide resources that may control the flow of threats at this enterprise facility 102 network entry point. Firewall facilities 138, and associated end-point computer security facility 152, may also be associated with a network node that may be equipped for interfacing between networks that use different protocols. In embodiments, the end-point computer security facility 152 may provide threat protection in a plurality of network infrastructure locations, such as at the enterprise facility 102 network entry point, i.e. the firewall facility 138 or gateway; at the server facility 142; at distribution points within the network, i.e. the routers and hubs 148; at the desktop of client facility 144 computers; and the like. In embodiments, the most effective location for threat detection may be at the user's computer desktop end-point computer security facility 152.

The interface between the threat management facility 100 and the enterprise facility 102, and through the appliance facility 140 to embedded end-point computer security facilities, may include a set of tools that may be the same for all enterprise implementations, but allow each enterprise to implement different controls. In embodiments, these controls may include both automatic actions and managed actions. Automatic actions may include downloads of the end-point computer security facility 152 to components of the enterprise facility 102, downloads of updates to existing end-point computer security facilities of the enterprise facility 102, uploaded network interaction requests from enterprise facility 102 components to the threat management facility 100, and the like. In embodiments, automatic interactions between the enterprise facility 102 and the threat management facility 100 may be configured by the threat management facility 100 and an administration facility 134 in the enterprise facility 102. The administration facility 134 may configure policy rules that determine interactions, such as developing rules for accessing applications, as in who is authorized and when applications may be used; establishing rules for ethical behavior and activities; rules governing the use of entertainment software such as games, or personal use software such as IM 162 and VoIP 164; rules for determining access to enterprise facility 102 computing resources, including authentication, levels of access, risk assessment, and usage history tracking; rules for when an action is not allowed, such as whether an action is completely deigned or just modified in its execution; and the like. The administration facility 134 may also establish license management, which in turn may further determine interactions associated with a licensed application. In embodiments, interactions between the threat management facility 100 and the enterprise facility 102 may provide threat protection to the enterprise facility 102 by managing the flow of network data into and out of the enterprise facility 102 through automatic actions that may be configured by the threat management facility 100 or the administration facility 134.

Client facilities 144 within the enterprise facility 102 may be connected to the enterprise facility 102 network by way of wired network facilities 148 or wireless network facilities 150. Client facilities 144 connected to the enterprise facility 102 network via a wired facility 148 or wireless facility 150 may receive similar protection, as both connection types are ultimately connected to the same enterprise facility 102 network, with the same end-point computer security facility 152, and the same threat protected enterprise facility 102 environment. Mobile wireless facility 150 clients 144, because of their ability to connect to any wireless 150 network access point, may connect to the internet 154 outside the enterprise facility 102, and therefore outside the threat-protected environment of the enterprise facility 102. In this instance the mobile client facility 144, if not for the presence of the end-point computer security facility 152 may experience a malware attack or perform actions counter to enterprise facility 102 established policies. In addition, there may be a plurality of ways for the threat management facility 100 to protect the out-of-enterprise facility 102 mobile client facility 144 that has an embedded end-point computer security facility 152, such as by providing URI filtering in personal routers, using a web appliance as a DNS proxy, or the like. Mobile client facilities 144 that are components of the enterprise facility 102 but temporarily outside connectivity with the enterprise facility 102 network, may be provided with the same threat protection and policy control as client facilities 144 inside the enterprise facility 102. In addition, mobile client facilities 144 may receive the same interactions to and from the threat management facility 100 as client facilities 144 inside the enterprise facility 102, where mobile client facilities 144 may be considered a virtual extension of the enterprise facility 102, receiving all the same services via their embedded end-point computer security facility 152.

Interactions between the threat management facility 100 and the components of the enterprise facility 102, including mobile client facility 144 extensions of the enterprise facility 102, may ultimately be connected through the internet 154. Threat management facility 100 downloads and upgrades to the enterprise facility 102 may be passed from the firewalled networks of the threat management facility 100 through to the end-point computer security facility 152 equipped components of the enterprise facility 102. In turn the end-point computer security facility 152 components of the enterprise facility 102 may upload policy and access requests back across the internet 154 and through to the threat management facility 100. The Internet 154 however, is also the path through which threats may be transmitted from their source. These network threats may include threats from a plurality of sources, including websites 158, e-mail 160, IM 162, VoIP 164, application software, and the like. These threats may attempt to attack a mobile enterprise facility 102 client facility 144 equipped with an end-point computer security facility 152, but in embodiments, as long as the mobile client facility 144 is embedded with an end-point computer security facility 152, as described above, threats may have no better success than if the mobile client facility 144 where inside the enterprise facility 102.

However, if the mobile client facility 144 where to attempt to connect into an unprotected connection point, such as at a secondary location 108 that is not a part of the enterprise facility 102, the mobile client facility 144 may be required to request network interactions through the threat management facility 100, where contacting the threat management facility 100 may be performed prior to any other network action. In embodiments, the client facility's 144 end-point computer security facility 152 may manage actions in unprotected network environments such as when the client facility 144 is in a secondary location 108 or connecting wirelessly 150 to a non-enterprise facility 102 wireless internet 154 connection, where the end-point computer security facility 152 may dictate what actions are allowed, blocked, modified, or the like. For instance, if the client facility's 144 end-point computer security facility 152 is unable to establish a secured connection to the threat management facility 100, the end-point computer security facility 152 may inform the user of such, and recommend that the connection not be made. In the instance when the user chooses to connect despite the recommendation, the end-point computer security facility 152 may perform specific actions during or after the unprotected connection is made, including running scans during the connection period, running scans after the connection is terminated, storing interactions for subsequent threat and policy evaluation, contacting the threat management facility 100 upon first instance of a secured connection for further actions and or scanning restricting access to network and local resources, or the like. In embodiments, the end-point computer security facility 152 may perform specific actions to remediate possible threat incursions or policy violations during or after the unprotected connection.

The secondary location 108 may have no end-point computer security facilities 152 as a part of its computer components, such as its firewalls 138, servers 142, clients 144, hubs 148, wireless hubs 150, and the like. As a result, the computer components of the secondary location 108 may be open to threat attacks, and become potential sources of threats, as well as any mobile enterprise facility 102 clients 144 that may be connected to the secondary location's 108 network. In this instance, these computer components may now unknowingly spread a threat to other components connected to the network.

Some threats may not come directly from the Internet 154, such as from non-enterprise facility 102 controlled mobile devices that are physically brought into the enterprise facility 102 and connected to the enterprise facility 102 client facilities 144. The connection may be made from direct connection with the enterprise facility's 102 client facility 144, such as through a USB port, or in physical proximity with the enterprise facility's 102 client facility 144 such that a wireless facility 150 connection can be established, such as through a Bluetooth connection. These physical proximity threats 110 may be another mobile computing device, a portable memory storage device, a mobile communications device, or the like, such as CDs and DVDs 170, memory stick 174, flash drive 174, external hard drive, cell phone 178, PDAs 180, MP3 players, digital cameras, point-to-point devices, digital picture frames, digital pens, navigation devices, appliances, and the like. A physical proximity threat 110 may have been previously infiltrated by network threats while connected to an unprotected network connection outside the enterprise facility 102, and when connected to the enterprise facility 102 client facility 144, pose a threat. Because of their mobile nature, physical proximity threats 110 may infiltrate computing resources in any location, such as being physically brought into the enterprise facility 102 site, connected to an enterprise facility 102 client facility 144 while that client facility 144 is mobile, plugged into an unprotected client facility 144 at a secondary location 108, and the like. A mobile device, once connected to an unprotected computer resource, may become a physical proximity threat 110. In embodiments, the end-point computer security facility 152 may provide enterprise facility 102 computing resources with threat protection against physical proximity threats 110, for instance, through scanning the device prior to allowing data transfers, through security validation certificates, through establishing a safe zone within the enterprise facility 102 computing resource to transfer data into for evaluation, and the like.

Now that the overall system has been described, we turn towards a set of embodiments for string searching. It should be understood that the following embodiments may be managed through a threat management facility 100 along with other services, such as those described herein.

String searching may provide an automated way for a computer facility to examine data for content that is of some interest, such as content that could harm the computing facility, content that is not allowed due to some policy, content that is not allowed to be transferred, and the like. For instance, the detection of malware in a data file may be of great importance in order to prevent the malware from doing harm to the computer facility or spreading the malware to other computer facilities. Alternatively, the content searched for may be confidential information, whose information may be personal private, company private, government private, and the like. In this instance it may be important to detect and block the transfer of such content. Content may also be prohibited through policy, such as unapproved applications; unapproved computer games; the use of profanity in a data file, email, correspondence, and the like. In embodiments, string searching may be capable of identifying a plurality of different types of content through the identification of at least one search string associated with the data file.

The application of a search string facility to the identification of target content may require the searching of a large number of strings, and this may in turn strain available resources in the execution of the string search. For instance, in the searching for malware there may be a large number potential malware items for each search, where each malware item may have a plurality of characteristic character strings that need to be searched on. In addition, when the large number of malware items with a potentially large number of characteristic character strings to search for, is combined with a large number of data files to search through, computer resources may quickly reach their capacity to handle the work load if a time efficient search string facility isn't employed. In embodiments, the present invention may provide for a time efficient way to search for character strings in a data file. In embodiments, the present invention may realize this time efficiency through a search procedure that doesn't require the examination of all data in the file, but only those data sequences that indicate that they may be a match to the target content. In addition, the present invention may provide for time efficient string searching while producing a minimum number of false positives. In embodiments, false positives may be significantly reduced through a final comparison of potentially matched content to the actual target content. In embodiments, the present invention may provide low false positive, time efficient string searching by minimizing the number of direct comparisons with actual target content through intelligent and systematic examination of data.

In embodiments of the present invention, a data file may be searched for a plurality of target pattern strings in an effort to identify content, such as malware, unwanted content, prohibited content, confidential content, relevant records, data leakage, and the like. In embodiments, the data file searched through may be a file on a file system, in a data stream, on a network, in memory, in a database, in an email, in a download, in a file transfer, and the like. In embodiments, the present invention may provide for the searching of a large number of strings in a large block or stream of data, the searching of large number of strings in a single pass through a block or stream of data, utilize a finite window or search string length that is only as large as the largest string that is being searched for, evaluate only the strings being searched for, not require a previous analysis of the block or stream of data, and the like. In embodiments, the present invention may provide an improved way for searching text for large numbers of character strings.

Figure 2:
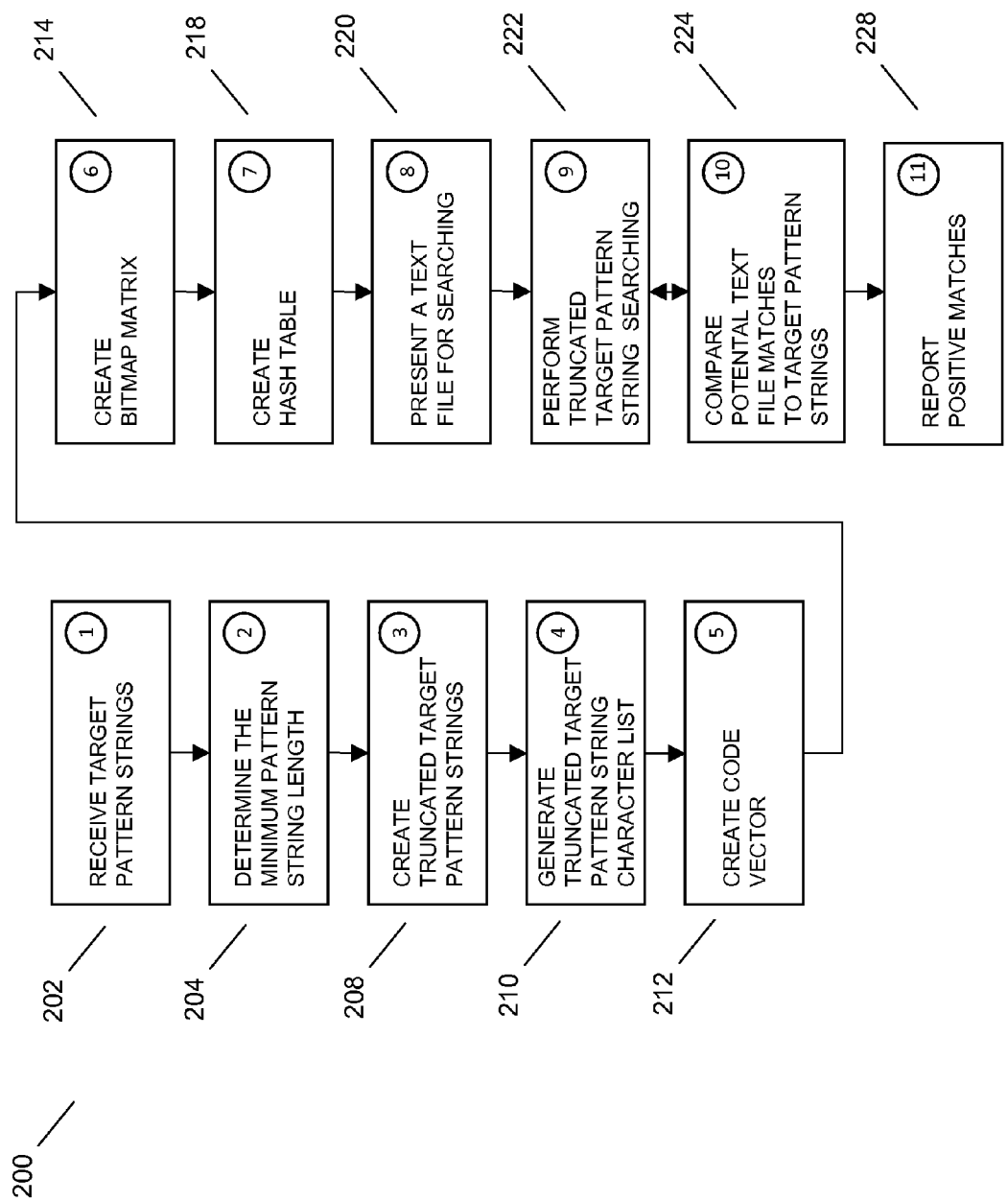
FIG. 2 depicts an embodiment of a process flow diagram for the present invention.

Referring to FIG. 2, an embodiment of a process flow of the present invention is provided. In step one 202 of the process flow, a plurality of target pattern strings may be received, where the target pattern strings may be of varying length. In step two 204, the minimum target pattern string length may be determined for the received plurality of target pattern strings. In step three 208, a plurality of truncated target pattern strings may be generated by truncating each of the received plurality of target pattern strings to the minimum target pattern string length through dropping leading characters from the target pattern strings. In step four 210, a truncated target pattern string character list may be generated of all characters contained in the plurality of truncated target pattern strings, where the truncated target pattern string character list may contain no repeating characters. In step five 212, a code vector list may be created that maps all possible 256 binary character byte values to an assignment value, where each of the truncated target pattern string characters may be assigned a unique assignment value, and the rest of the possible 256 binary character byte values may be assigned an assignment value that identifies it as not being a truncated target pattern string character.

Continuing to refer to FIG. 2, in step six 214 of the process flow a bitmap matrix may be created that maps the location of truncated target pattern string character pairs in the plurality of truncated target pattern strings to bitmasks. Each bit in the bitmask may represent one location of a character pair in the truncated pattern strings, where "location" is the distance from the end of each pattern string. Each bitmask may thereby represent all locations of a given character pair in the truncated target pattern strings. In step seven 218, a hash table may be created that maps the truncated target pattern strings to the plurality of target pattern strings, where there may be more than one possible target pattern string associated with each truncated target pattern string. In step eight 220, a text file may be presented for target pattern string searching. In step nine 222, a truncated target pattern string search may be performed on the text file, where the truncated target pattern string search utilizes the code vectors and the bitmap matrix to identify potential truncated target pattern string matches within the text file. In embodiments, the truncated target pattern string search may sequentially scan the data stream one portion at a time, where the portion may be related to the minimum target pattern string length. In step ten 224, potential truncated target pattern strings may be compared in the searched text file to the target pattern strings. In embodiments, this step may provide for comparison of the potential truncated target pattern found in the text file to the truncated target pattern strings, as well as any subsequent comparison to the target pattern strings required as a result of multiple positive matches made to the truncated target pattern strings. And finally, any positive matches found during the string search may be reported, such as to the threat management facility 100.

Now that an overall process flow has been provided, we provide a more detailed example of an embodiment of the present invention, including a detailed example of an embodiment of how the truncated target pattern string searching 222 may be performed. Note that this example provides an embodiment of the present invention, and is not meant to be limiting in any way. One skilled in the art will recognize that alternate steps or processes are possible, both in function and in sequence, and fall under the scope and intent of the present invention.

Figure 3:
FIG. 3 depicts an example of a received target pattern string, in an embodiment of the present invention.

In embodiments, a text file may be searched for the occurrence of at least one of a plurality of target pattern strings. FIG. 3 provides an example set of target pattern strings to be searched for, and provides the beginning of an example for how the invention may be used. In this example, step one 202 includes the identification of ten target pattern strings for searching against: alpha, gamma, delta, epsilon, kappa, lambda, omicron, sigma, upsilon, and omega.

Figure 4:
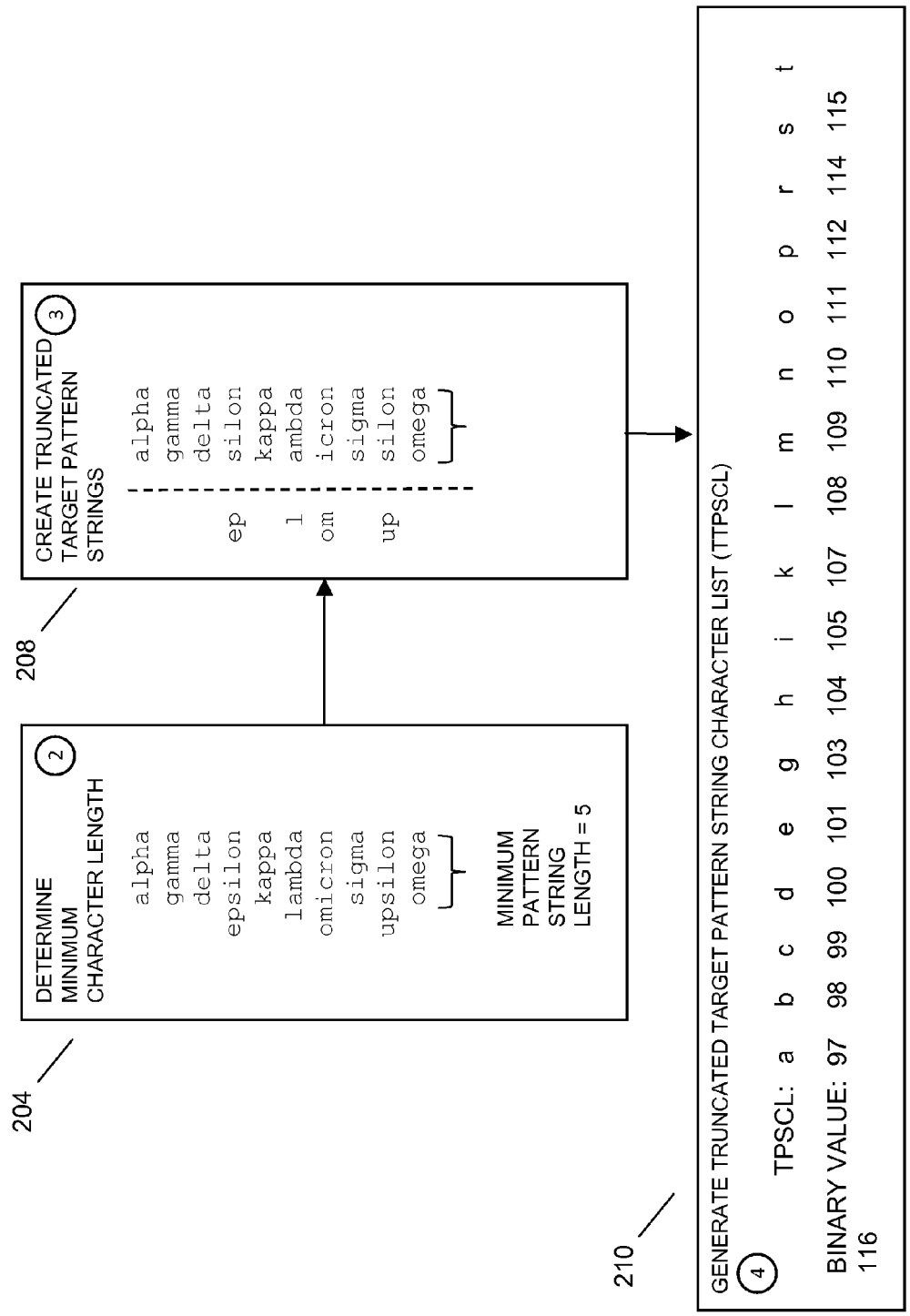
FIG. 4 depicts an example of a target pattern string being truncated and subsequently used to generate a truncated target pattern string character list, in an embodiment of the present invention.

Referring to FIG. 4, an example of steps two 204, three 208, and four 210 are provided. In embodiments, step two 204 may be associated with the determination of a minimum pattern string length. As can be seen, in this example the minimum pattern string length is five, where this value may be used later in the procedure as part of the search sequence process. Once the minimum pattern string length has been established, it may be used for truncating the received target strings, as shown in step three 208, where in this instance the right most five characters have been maintained. Step four 210 is shown generating a truncated target pattern string character list (TTPSCL), consisting of all the characters included in any of the truncated target pattern strings, and in this case includes 17 characters: 'a', 'b', 'c', 'd', 'e', 'h', 'i', 'k', 'l', 'm', 'n', 'o', 'p', 'r', 's', and 't'. Note that the figure lists the character's binary value, such as in ASCII, ASCII extensions, ASCII variants, Unicode, and the like.

Referring to FIG. 5, in step five 212 the binary values of the TTPSCL may be assigned either unique values, for binary codes corresponding to characters included in the TTPSCL, or another value that may indicate that the binary code does not correspond to any character in the TTPSCL. In this example, the unique assignment values are a non-negative value sequential numbering of the 17 characters in the TTPSCL, and the assignment value identifying non-TTPSCL characters is a negative one. In embodiments, other values may be assigned to the binary values.

Referring to FIG. 6, in step six 214 of the example, the bitmap matrix is created, which may map pairs of characters (represented by their corresponding code) to bitmasks. FIG. 6 presents an embodiment of a completed bitmap matrix for the characters listed in the TTPSCL of this example. Each element of the matrix may represent a bitmask for a particular pair of characters. In this example, the entire TTPSCL is listed in the column header and the row header, where the row represents the first character in the pair, and the column represents the second character in the pair. For example, the character pair 'am' is represented by crossing the 'a' in the row header with the 'm' in the column header. The corresponding bitmask value of '0C', represented here in Hex code, is associated with where the character pair 'am' is found in the target pattern strings. Note that the row and column headings shown in this example are depicted as the TTPSCL characters. In embodiments, the matrix indexes may be code values, such as in the range 0-16.

Although FIG. 6 uses a two dimensional example of a bitmap matrix, where only pairs of characters are searched for, in embodiments the bitmap matrix may be a plurality of dimensions, such as three dimensions, four dimensions, n-dimensions, and the like. For example, the bitmap matrix may extend to higher dimensions by searching for occurrences of three, four, n-character-tuples instead of just looking for character-pairs, such as described herein.

Figure 7:
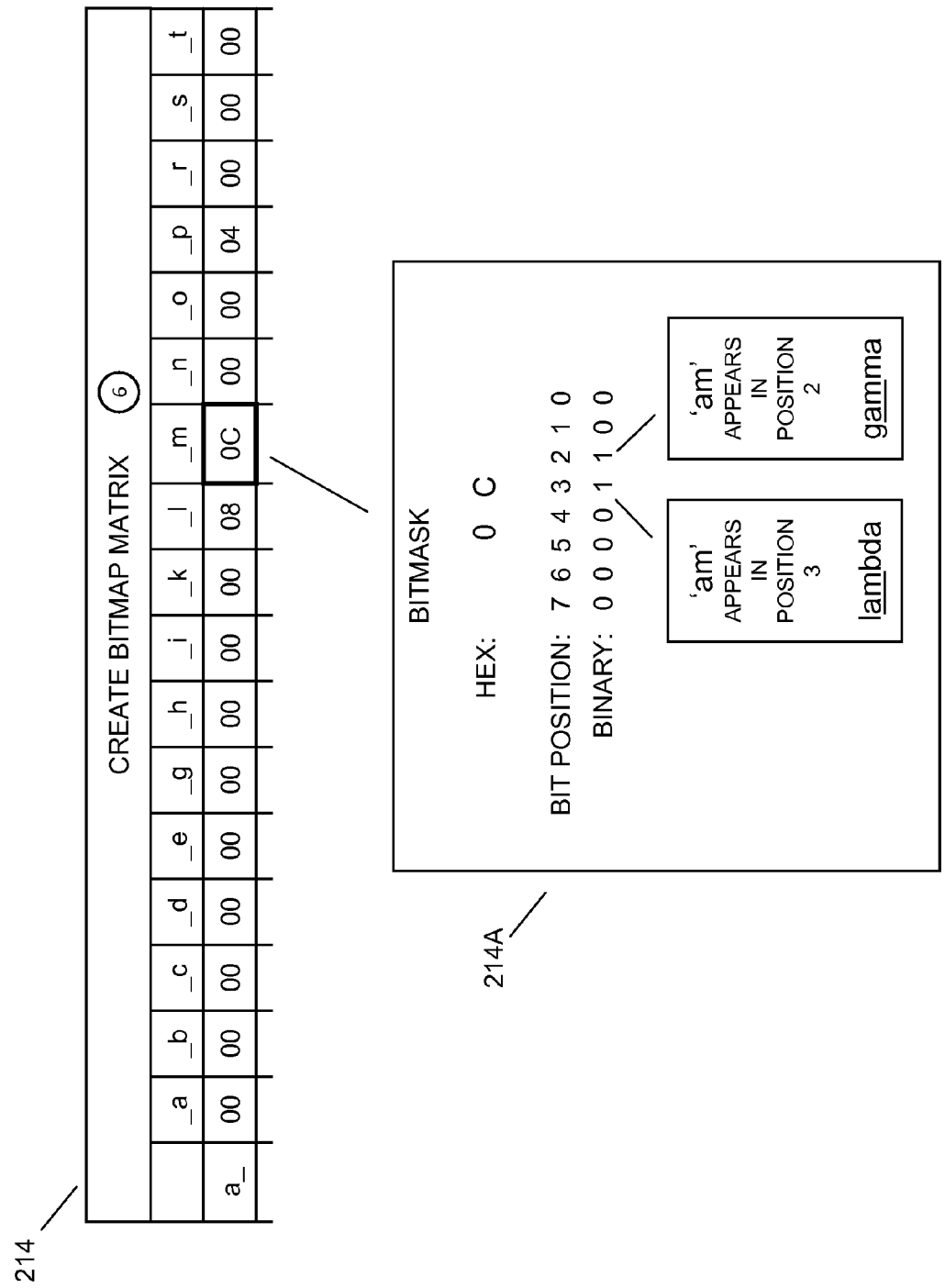
FIG. 7 depicts an example of a bitmask as an element within the bitmap matrix, in an embodiment of the present invention.

Referring to FIG. 7, an example of an embodiment of the bitmask (i.e., the contents of a single cell in the bitmap matrix) is provided. In describing the contents of the bitmap matrix in more detail, the bitmask may be considered to provide a map for determining where the specified character pair is located in the target pattern strings. For example, in the case of the character pair 'am', the pair shows up in two different target pattern strings, 'lambda' and 'gamma'. In lambda, 'am' shows up in position 3, that is, in the third possible pair position counting from the right most character. In this way, position 0 is taken by 'da', position 1 by 'bd', position 2 by 'mb', and position 3 by 'am'. Notice that the character pair 'la' is not considered a valid pair for this example, as the identified minimum length has been determined to be five, and so 'l', the sixth character, is not considered in the generation of the bitmask—only character pair positions within the truncated target pattern strings are considered. Now, since the character pair 'am' is also in position 2 in the target pattern string 'gamma', both position 2 and position 3 are identified in association with the 'am' bitmask. In this example, position 2 and position 3 are indicated as having a match to the character pair 'am' by setting the bits in position 2 and position 3 in the bitmask byte. As shown in the figure, with position 2 and position 3 set, and the other bits not set, a bitmask byte value of 00001100 B is established, which is equivalent to 0C H in hex code. All other bitmasks are generated in a similar fashion for all the other combinations of character pairs, and together they make up the bitmap matrix. In embodiments, the bitmasks may be of any length capable of holding as many bits as the minimum pattern-string length.

Figure 8:
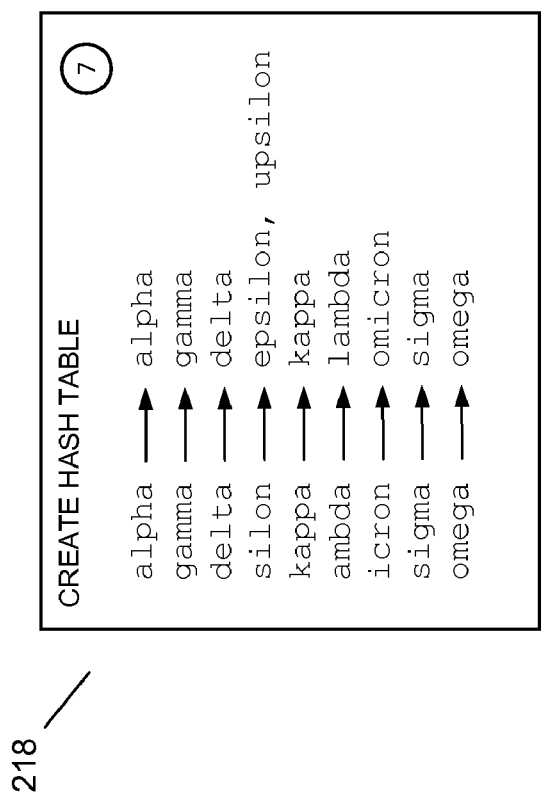
FIG. 8 depicts an example of a hash table, in an embodiment of the present invention.

Referring to FIG. 8, the creation of the hash table is provided, as in step seven 218 of the embodiment of the process flow. In embodiments, a hash table may be used to match the truncated target pattern string with the originally received target pattern string. In this example, the hash table takes the truncated target pattern strings, and lists the possible target pattern strings that it could represent. For instance, the truncated target pattern string 'alpha' can only ever be the target pattern string 'alpha', because there are no other target pattern strings that have 'alpha' as the last five letters. In another example however, the truncated target pattern string 'silon' may be a match for either 'epsilon' or 'upsilon'. The hash table may therefore be used in the identification of the five character truncated target pattern strings found in string searching, where the hash table provides the translation from truncated target pattern string to originally received target pattern string. In embodiments, other look-up or indexing algorithms may be employed in the identification of target pattern strings.

Figure 9:
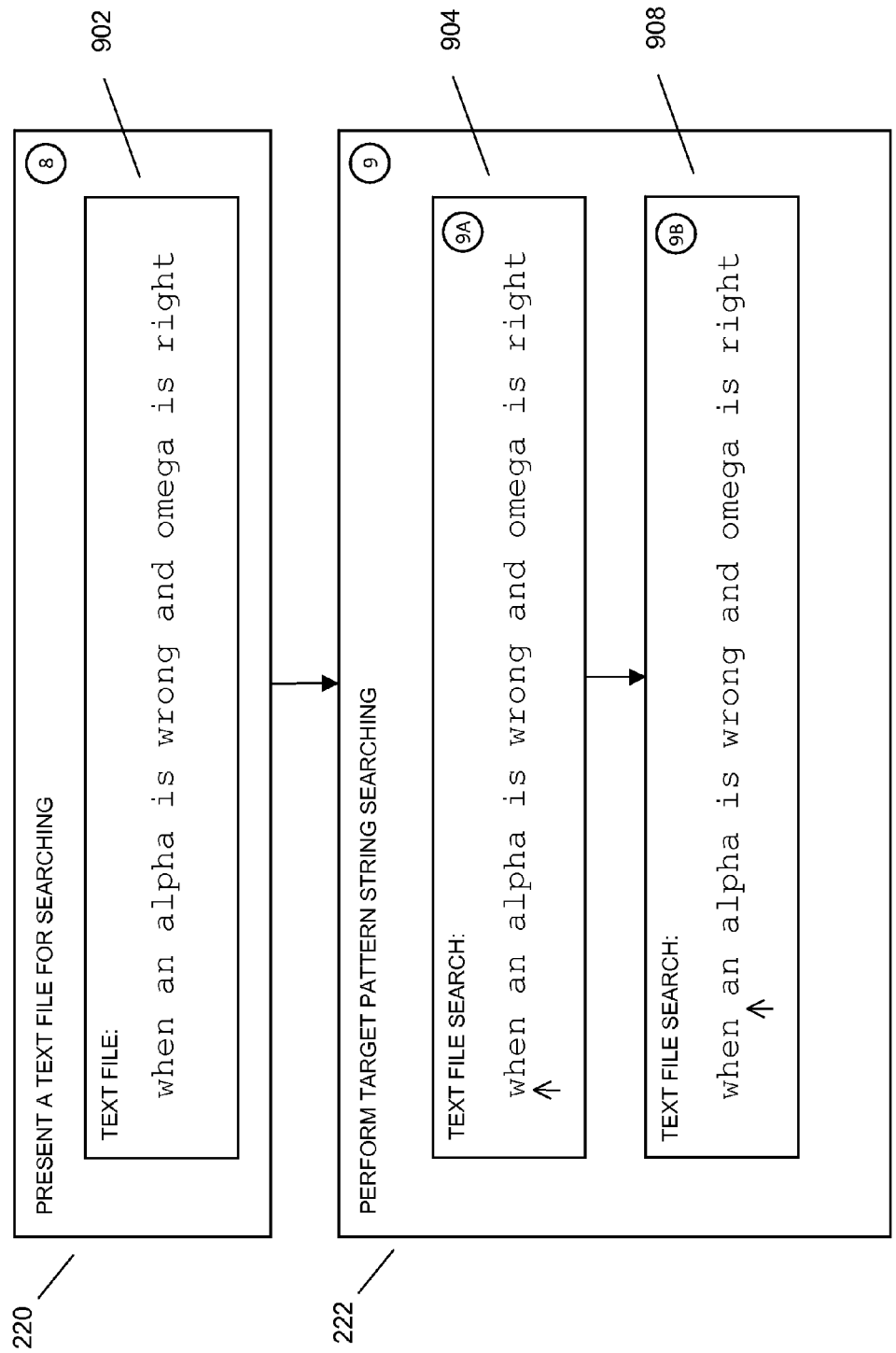
FIG. 9 depicts an example of the start of a string search, in an embodiment of the present invention.

Referring to FIG. 9, in embodiments, the code vector and bitmap matrix may now be utilized to search a text file for the presence of the target pattern strings. This may be done by methodically searching through the text file, jumping in steps equal to the minimum pattern string length and comparing the character found with the code vector list. If the examined character is found in the code vector list, then the preceding characters in the text are further examined utilizing both the code vector test and the bitmap matrix. Continuing with the example, and referring to the figure, step eight 220 may be the presentation of the text file to be searched, such as a text file consisting of "when an alpha is wrong and omega is right". In step nine 222, the text may be searched for the presence of any of the truncated target pattern strings. In step 9A 904 the pointer may be initially set to the first character in the text file. Step 9B 908 then shows the pointer incremented five positions (the minimum target string length) to a '[space]' character. This character is then checked against the code vector. In this instance, the '[space]' is not found to be one of the uniquely assigned values, rather, it is found to have the value of negative one in the code vector, which is an indication that the character is not in the TTPSCL. The search then continues.

Figure 10:
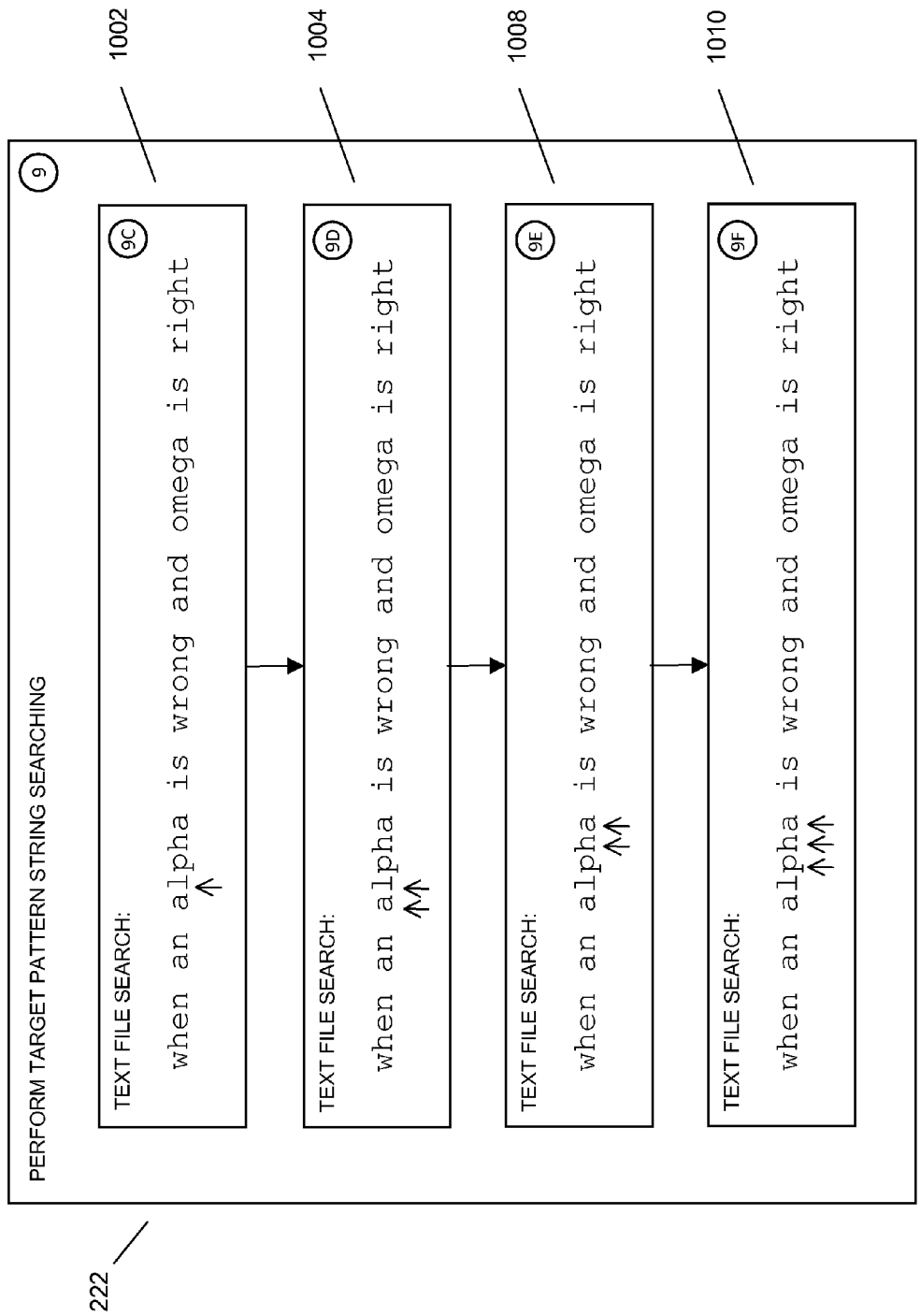
FIG. 10 depicts an example of a string search identifying truncated search pattern string pairs in the searched text, in an embodiment of the present invention.

Referring to FIG. 10, since the last character was not found in the code vector, the pointer is incremented another five positions to a character 'l', as shown in step 9C 1002. In this instance however, the character 'l' is found in the code vector, with a value other than negative one, and so further examination of the preceding characters is executed. The pointer decrements one and examines this preceding first character, as shown in step 9D 1004, and determines that it too is to be found in the code vector. Now, since it has been shown that there are two adjacent code vector values, a valid character pair, the bitmap matrix may now be used to look up the bitmask for the character pair, which in this case is 'al'. When retrieved, the corresponding bitmask is found to have the value 08H, or 00001000 B, which indicates that the character pair 'al' only occurs in position 3. With this assumed, the pointer is incremented three positions in order to examine the characters in position 13, as shown in step 9E 1008. As before, first the characters are examined to determine if they map to a value other than negative one in the code vector, where in this case, both 'h' and 'a' do. The 'ha' pair is now looked up in the bitmap matrix, and it is found that 'ha' may be found in position 0, validating this position. The pointer is then decremented one more time, as shown in 9F 1010, in order to perform the same set of actions on the 'ph' pair, which again, yields a match to the core vectors, and a match to the position of 'ph'. And so the progression continues.

Figure 11:
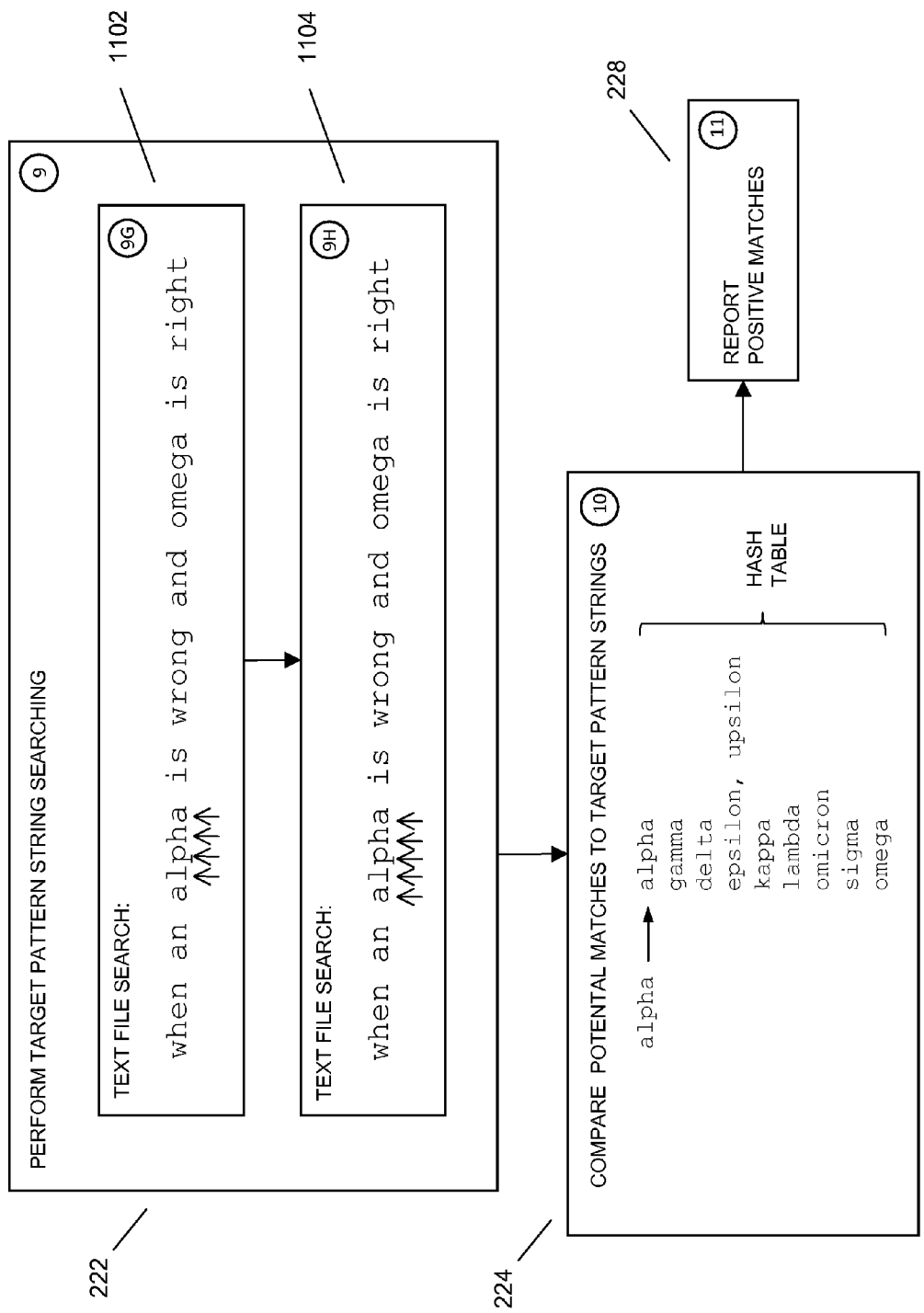
FIG. 11 depicts an example of a string search identifying a truncated target pattern string within the searched text and subsequent verification for match reporting, in an embodiment of the present invention.

Referring to FIG. 11, the progression is completed in steps 9G 1102 and 9H 1104, as the pattern string 'alpha' is identified as a potential match to the target pattern string list, whose match is determined in step ten 224 utilizing the hash table. The potential truncated target pattern string is then compared to the list of truncated target pattern strings in the hash table. If the match is not positive, then searching continues, and no report is generated. If there is a match, and the match is limited to only one of the truncated target pattern strings, then a report is generated 228. If there is a match, and the match is not limited to one of the truncated target pattern strings (such as the case where 'silon' could match epsilon or upsilon), then a further comparison is made including the entire target pattern string to verify which of the target pattern strings has been found. If a positive match is then found, a report is generated. In this instance, the found string 'alpha' only matches up to the targeted pattern string 'alpha', and no other, and so is a positive match has been found. This positive match may then be reported, as shown in step eleven 228.

Figure 12:
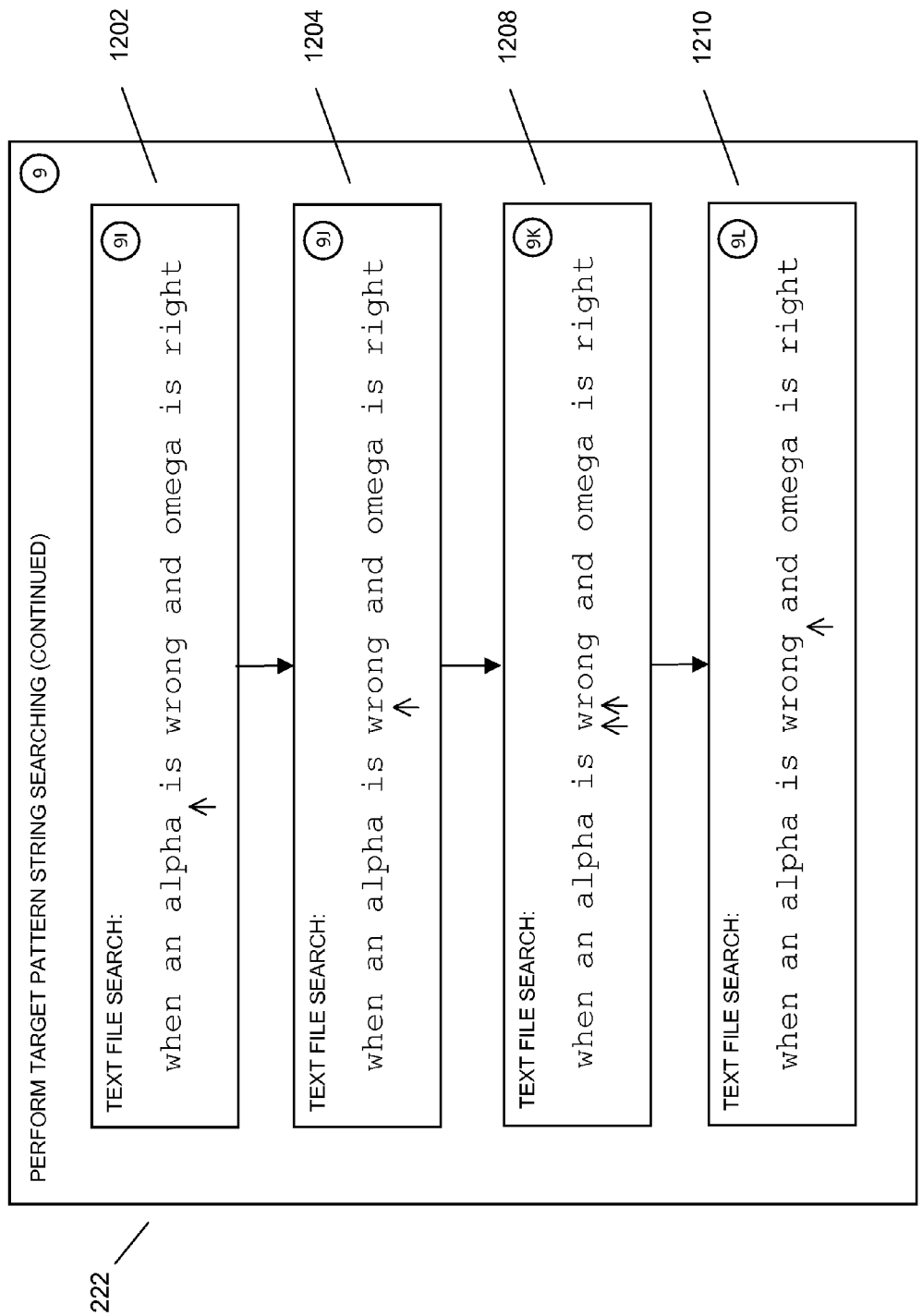
FIG. 12 depicts an example of a string search showing how the search pointer is incremented forward in search of truncated target pattern string matches, in an embodiment of the present invention.

Referring to FIG. 12, the search may now continue, where at step 9I 1202, the pointer is incremented five positions from the left most position, as shown. In embodiments, the pointer jump may also be described as jumping from the right most position five minus the number of decrements executed, such as in this case, the pointer was decremented four times, so 5−4=1, and the pointer is incremented one from the right most position. In either case, the pointer now ends up at a '[space]' as shown in 9I 1202. Since the '[space]' maps to a negative one in the code vector, the pointer is again advanced five positions to the 'r', as shown in step 9J 1204. The 'r' is found in the code vector, but in the next decrement, shown in step 9K 1208 the 'w' is not. So again, the pointer is advanced five positions from the left most position, to another '[space]', as shown in step 9L 1210, which is again found to have a value of negative one in the code vector.

Figure 13:
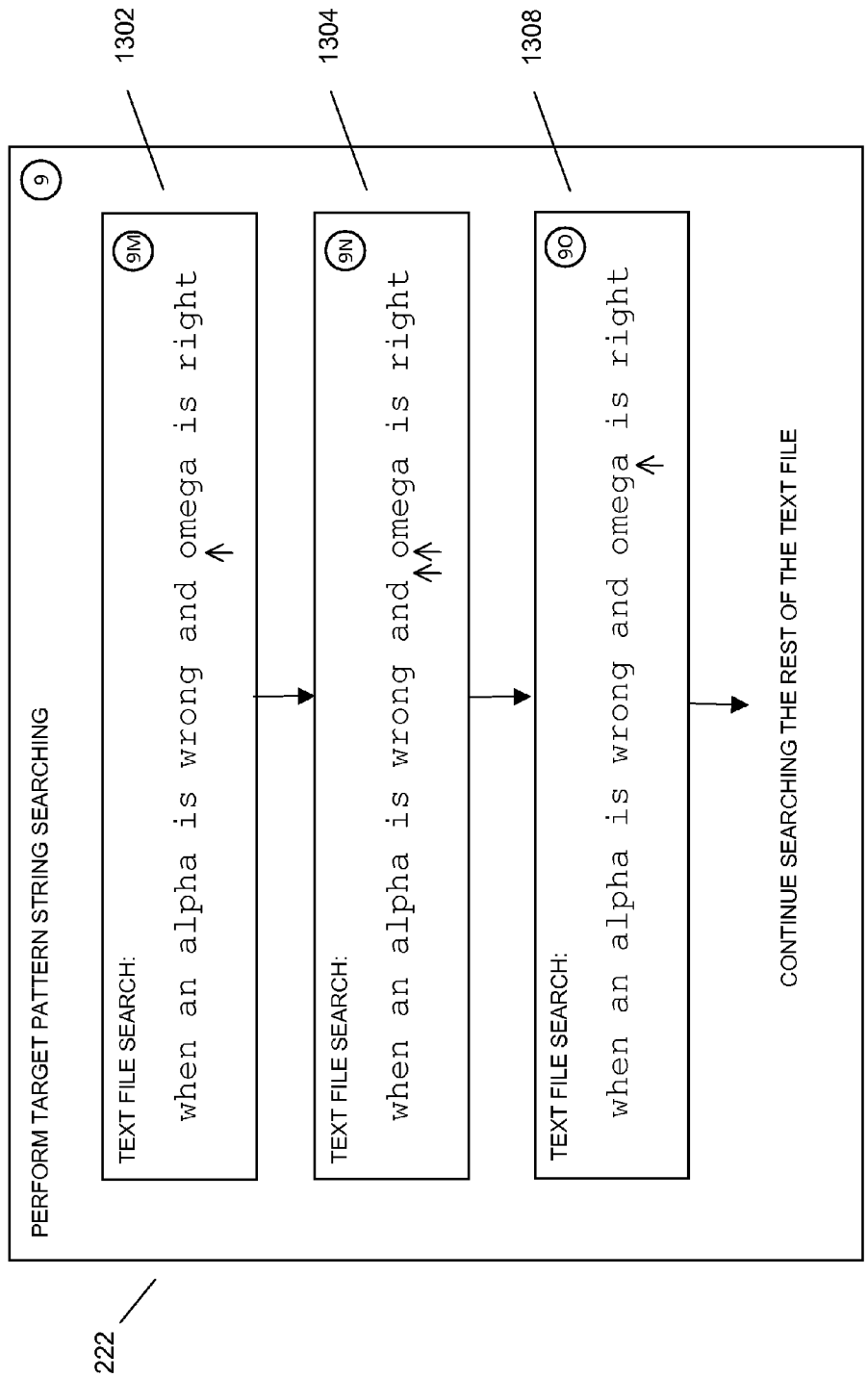
FIG. 13 depicts an example of a string search showing the search finding another potential truncated target pattern string, in an embodiment of the present invention.

Referring to FIG. 13, the pointer is then incremented five more positions to the 'o', as shown in step 9M 1302, which is a code vector match. But when the pointer is decremented in step 9N 1304, it finds another '[space]', and increments another five positions to the 'a' as shown in step 9O 1308, where the process described for finding 'alpha' is repeated, leading to second positive match, and another report of a positive match. This process then continues until the end of the text file is reached.

The preceding example is meant to be illustrative of how the process of the present invention may be performed on a small set of target pattern strings. One skilled in the art will recognize how the present invention may be applied to string searches involving a large list of target pattern strings.

Figure 14:
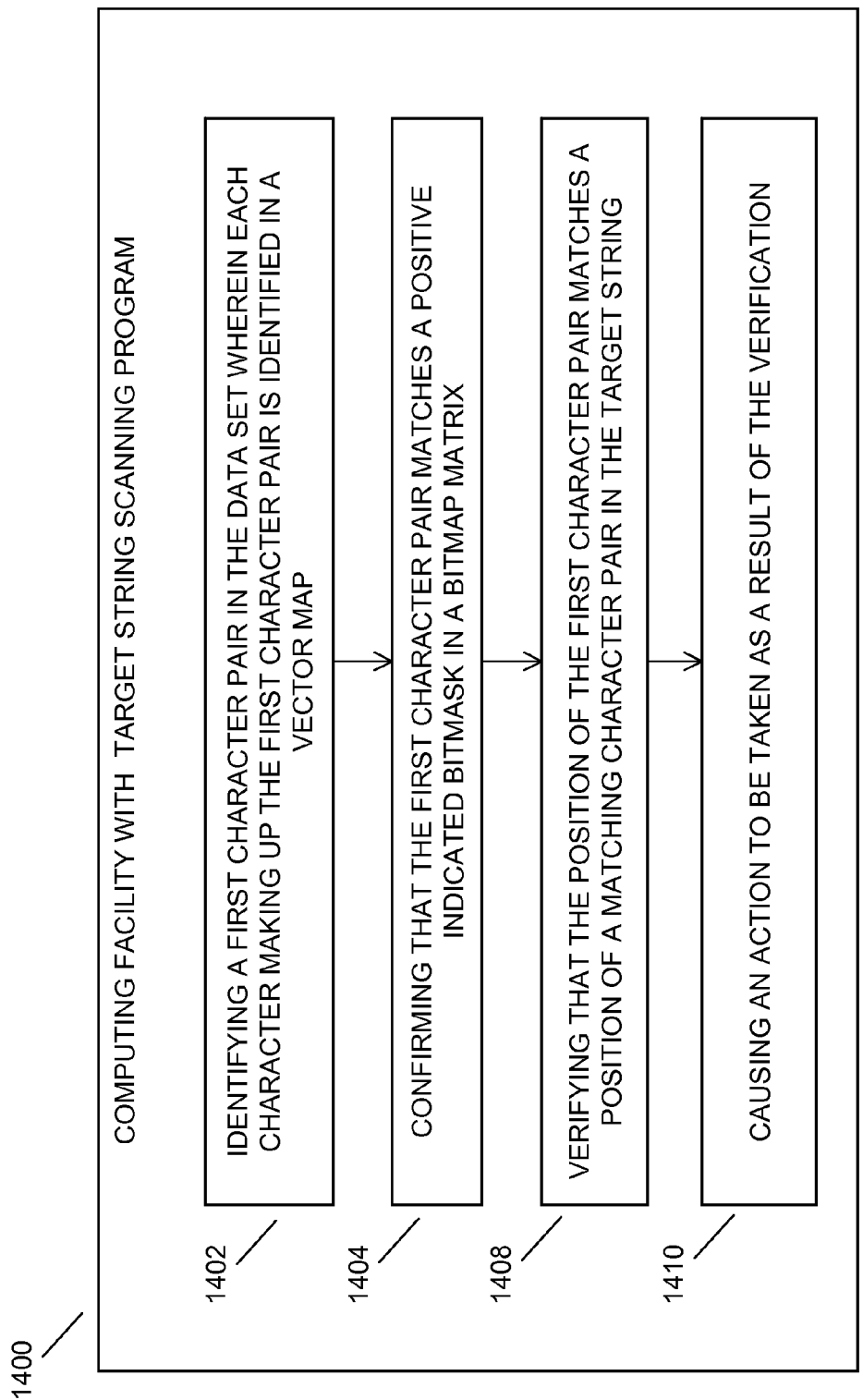
FIG. 14 depicts a process flow in an embodiment of the present invention.

Referring to FIG. 14, an embodiment 1400 of a process flow of the present invention is provided, where scanning a data set for the presence of a target string may begin with receiving the data set at a computing facility and causing a scanning program to execute the following steps. Step A 1402, a first character pair in the data set may be identified where each character making up the first character pair is identified in a vector map. Step B 1404, confirm that the first character pair matches a positive indicated bitmask in a bitmap matrix. Step C 1408, verify that the position of the first character pair matches a position of a matching character pair in the target string. And step D 1410, an action may be caused to be taken as a result of the verification. In embodiments, repeating step A prior to step D may be provided to identify a second character pair wherein each character making up the second character pair is identified in a vector map. Repeating step B prior to step D may be further provided to confirm that the second character pair matches at least one bitmask identified in a bitmap matrix. And further, repeating step C prior to step D may be provided to verify that the position of the second character pair matches an expected position of a matching character pair in the target string. In embodiments, the first character pair may be located at a last end of a data segment in the data set. A second character pair may be identified prior to causing the action to be taken. In addition, the second character pair is identified by decrementing through the data segment.

In embodiments, the target string may be a truncated target string, where the truncated target string is only as long as the shortest of a plurality of target strings. The scanning of the data set may involve scanning for strings of data of a length not longer than the truncated target string. The action may be a hashing step to further verify that a data segment associated with the first character pair is a suspect data segment, an identification of the data set as a suspect data set, an identification of the data set as a suspect file, an identification of the data set as a targeted data set, and the like. The scanning program may be attempting to identify the data set as unwanted content, where the unwanted content is spam, malware, host intrusion prevention system (HIPS), an unwanted program, data being transmitted in violation of a confidentiality policy, and the like. In embodiments, the data set may be a file, application, in the form of streaming data that is to be analyzed, data stored in a temporary storage medium, data stored in a semi-permanent storage medium, data stored in long term memory, data stored in a database, and the like.

Figure 15:
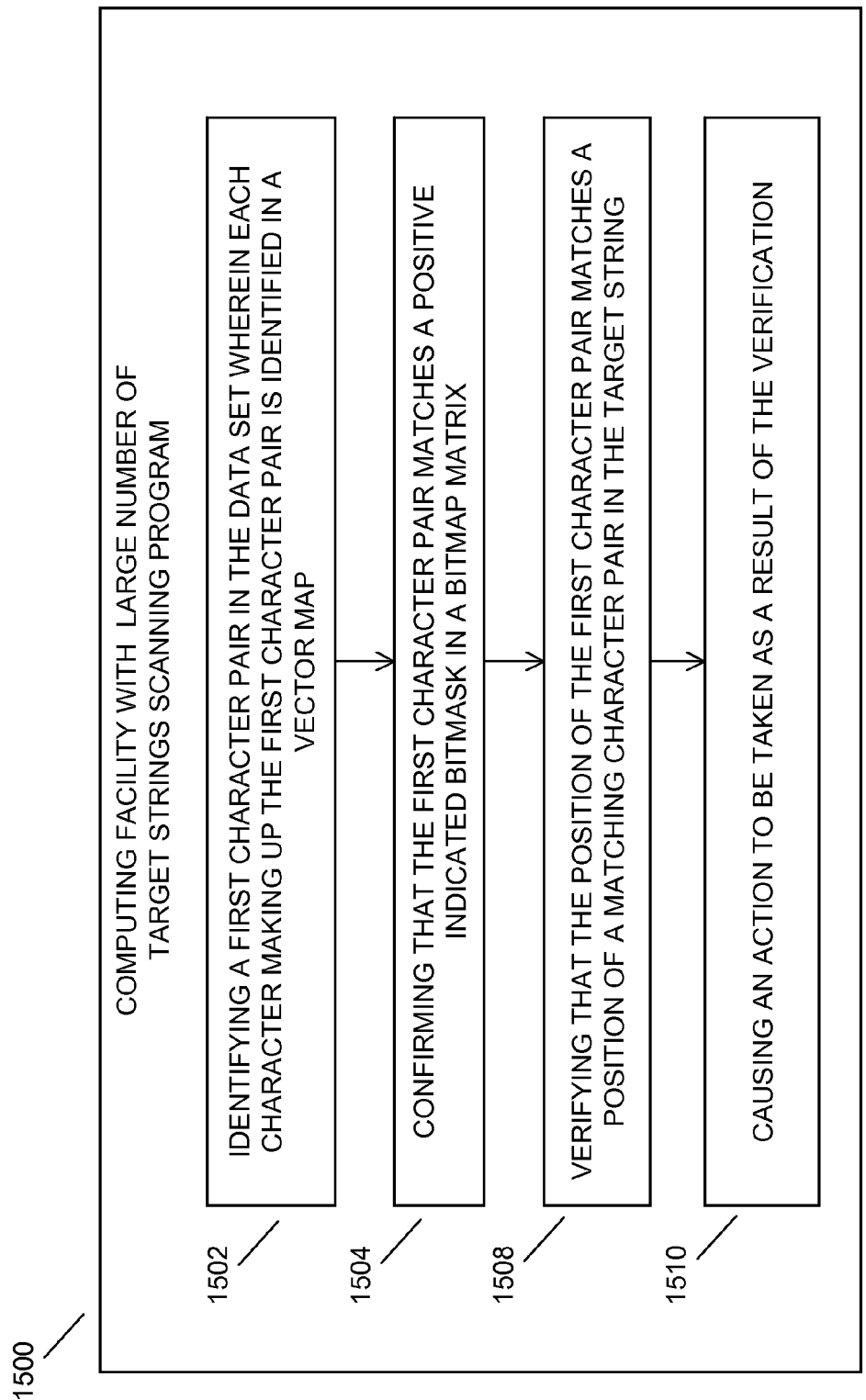
FIG. 15 depicts a process flow in an embodiment of the present invention.

Referring to FIG. 15, an embodiment 1500 of a process flow of the present invention is provided, where scanning a data set for the presence of a large number of target strings may begin with receiving the data set at a computing facility and causing a scanning program to execute the following steps a plurality of times to scan for the target strings throughout the data set. Step E 1502, a first character pair in the data set may be identified where each character making up the first character pair is identified in a vector map. Step F 1504, confirm that the first character pair matches a positive indicated bitmask in a bitmap matrix. Step G 1508, verify that the position of the first character pair matches a position of a matching character pair in the target string. And step H 1510, an action may be caused to be taken as a result of the verification.

Figure 16:
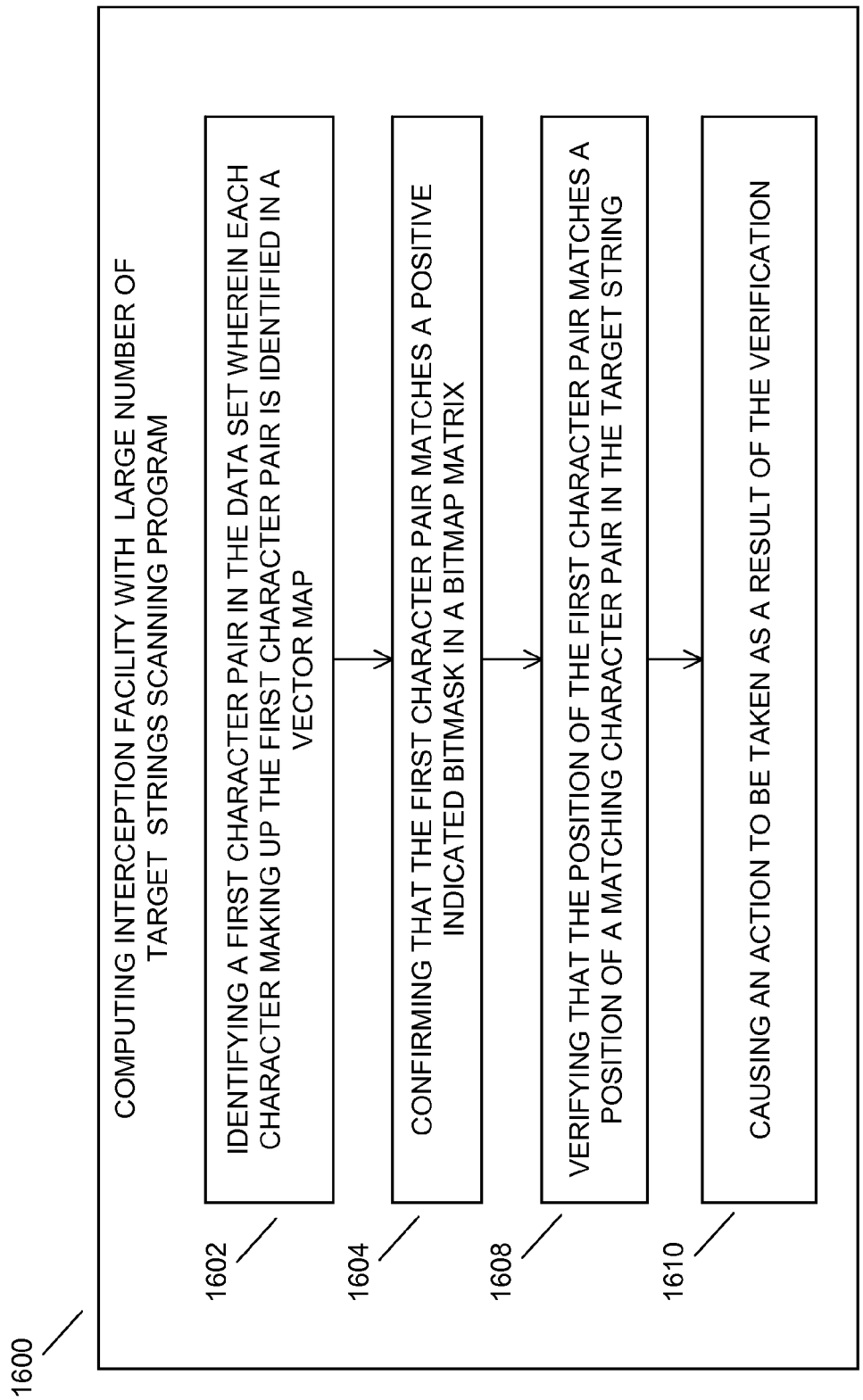
FIG. 16 depicts a process flow in an embodiment of the present invention.

Referring to FIG. 16, an embodiment 1600 of a process flow of the present invention is provided, where scanning a data set for the presence of a large number of target strings may begin with intercepting the data set at a computing facility and causing a scanning program to execute the following steps. Step I 1602, a first character pair in the data set may be identified where each character making up the first character pair is identified in a vector map. Step J 1604, confirm that the first character pair matches a positive indicated bitmask in a bitmap matrix. Step K 1608, verify that the position of the first character pair matches a position of a matching character pair in the target string. And step L 1610, an action may be caused to be taken as a result of the verification.

Figure 17:
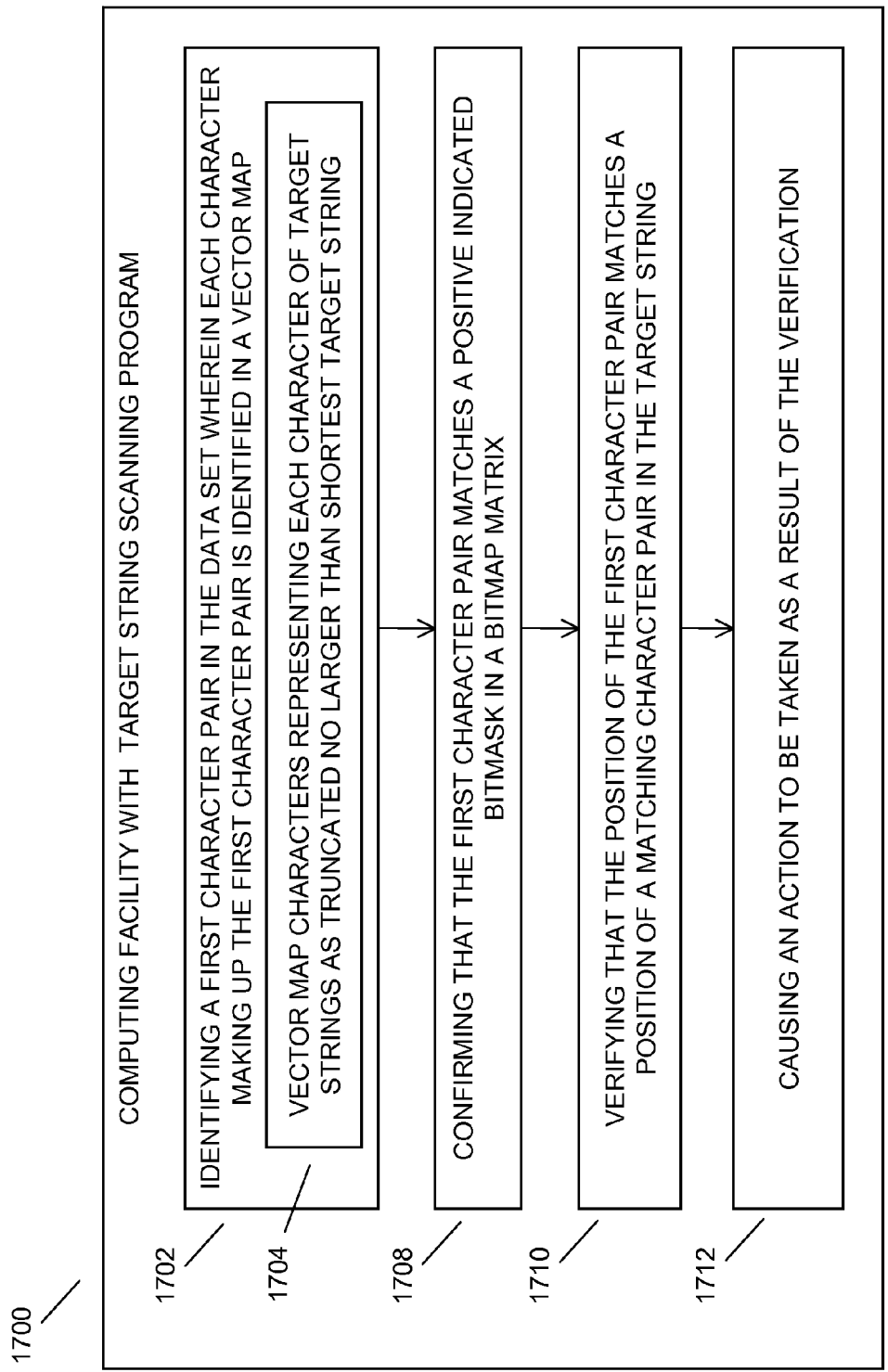
FIG. 17 depicts a process flow in an embodiment of the present invention.

Referring to FIG. 17, an embodiment 1700 of a process flow of the present invention is provided, where scanning a data set for the presence of a target string may begin with receiving the data set at a computing facility and causing a scanning program to execute the following steps. Step M 1702, a first character pair in the data set may be identified where each character making up the first character pair is identified in a vector map. The vector map may contain characters representing each character of the target strings as truncated to be no larger than the shortest target string being scanned for. Step N 1704, confirm that the first character pair matches a positive indicated bitmask in a bitmap matrix. Step O 1708, verify that the position of the first character pair matches a position of a matching character pair in the target string. And step P 1710, an action may be caused to be taken as a result of the verification.

Figure 18:
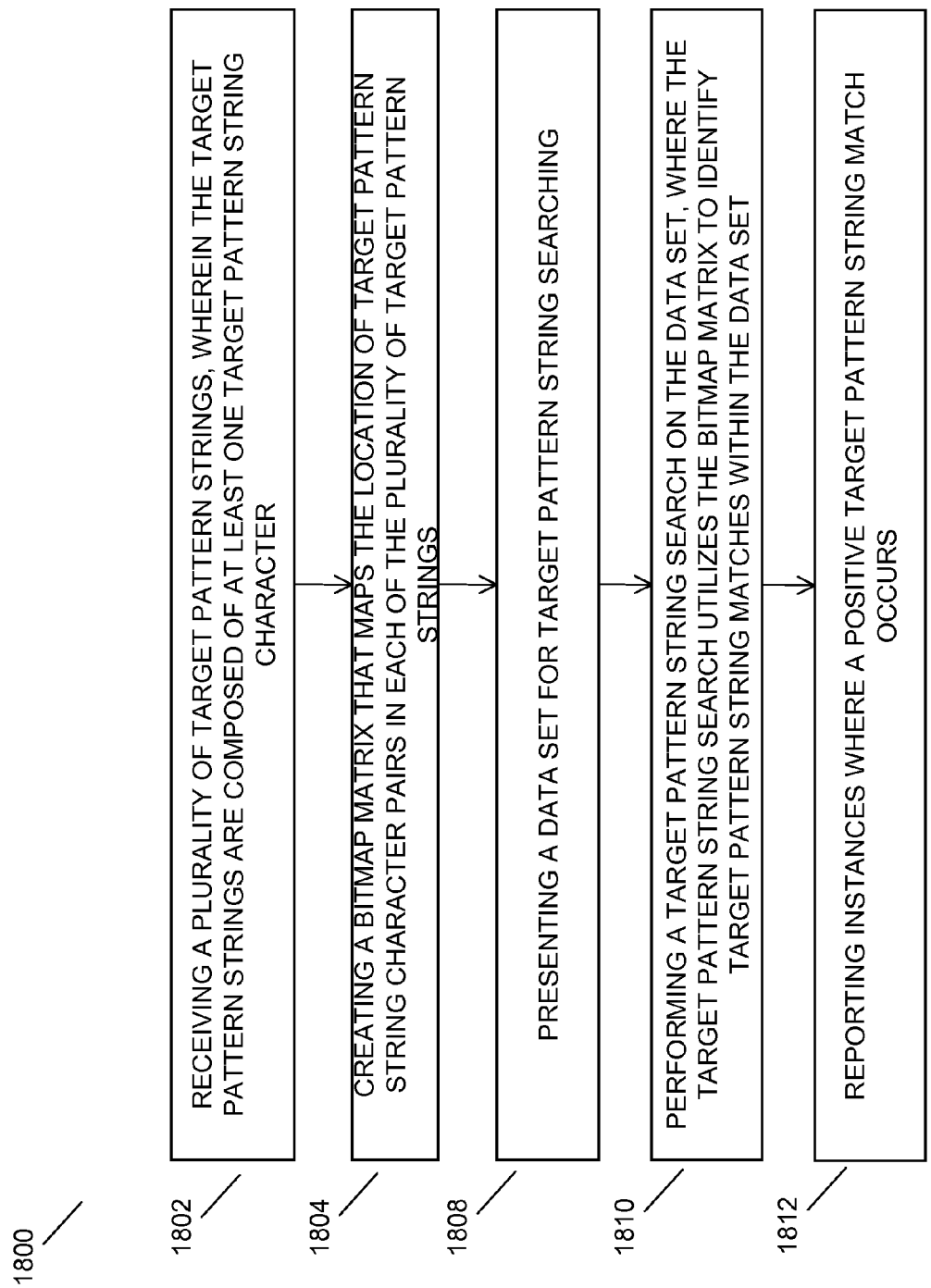
FIG. 18 depicts a process flow in an embodiment of the present invention.

Referring to FIG. 18, an embodiment 1800 of a process flow of the present invention is provided, where a plurality of target pattern strings may be received 1802, and where the target pattern strings may be composed of at least one target pattern string character. A bitmap matrix may be created that maps the location of target pattern string character pairs in each of the plurality of target pattern strings 1804. A data set may be presented for target pattern string searching 1808. A target pattern string search may be performed on the data set, where the target pattern string search may utilize the bitmap matrix to identify target pattern string matches within the data set 1810. Instances may be reported where a positive target pattern string match occurs 1802.

In embodiments, the positive target pattern string match may be a match between at least one of the plurality of target pattern strings and a string in the data set. The target pattern string search may utilize a minimum target pattern string length. The minimum target pattern string length may set a search length in the target pattern string search. The search length may be associated with the number of characters skipped in the target pattern string search when no character match is found. The character match may be between at least one of the characters in at least one of the plurality of target pattern strings and a character found in the data set. The minimum target pattern string length may be used to generate a truncated target pattern string by truncating the target pattern string to the minimum target pattern string length. The truncated target pattern string list may be mapped to the plurality of target pattern strings, where the mapping utilizes a hash table.

In embodiments, the target pattern string search may employ a search pattern utilizing the bitmap matrix and a code vector, where a bitmask represents the location of target pattern character pairs associated with each possible pair combination of target pattern string characters. The code vector may be associated with a target pattern string character list. The target pattern string character list may contain all of the characters in the plurality of target pattern strings. The code vector may map at least one of the target pattern string characters of at least one of the plurality of target pattern strings to an assigned value. The search pattern may be associated with a search length, where the search pattern may increment forward through the data set by the search length when no character match is found. The search pattern may decrement backwards by one when a character match is found. The search pattern may compare the target pattern string character pair when two adjacent character matches are found. The search pattern may decrement backwards by one when a target pattern string character pair is found that matches at least one of the bitmap matrix bitmask indicated target pattern string character pair positions to the present pair position in the target pattern string search. The search pattern may then compare a found text string of the search length within the data set, which may have been found to match both core vectors for all characters within the search string and bitmask pair positions for all character pairs within the found search string, and the plurality of target search strings for a positive match.

In embodiments, the present invention may provide a string search procedure that results in a decreased time for scanning a text file due to the creation of truncated target pattern search strings through utilization of a minimum pattern string length, the utilization of a code vector and a bitmap matrix associated with the truncated target pattern search strings, final comparison of only potential target pattern strings with the actual target pattern strings, and the like. Although certain embodiments of the invention have been presented to illustrate the process flow, it will be appreciated that other embodiments may satisfy the intent of the invention.

The elements depicted in flow charts and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise clear from the context.

Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A method of scanning a data set for the presence of a target string comprising:
    receiving the data set at a computing facility and causing a scanning program to execute the following steps:
        A. identifying a first character pair in the data set wherein each character making up the first character pair is identified in a vector map;
        B. confirming that the first character pair matches a positive indicated bitmask in a bitmap matrix;
        C. verifying that the position of the first character pair matches a position of a matching character pair in the target string; and
        D. causing an action to be taken as a result of the verification; and
    repeating step A prior to step D to identify a second character pair wherein each character making up the second character pair is identified in a second vector map.

2. The method of claim 1, further comprising repeating step B prior to step D to confirm that the second character pair matches at least one bitmask identified in the bitmap matrix.

3. The method of claim 2, further comprising repeating step C prior to step D to verify that the position of the second character pair matches an expected position of a matching character pair in the target string.

4. The method of claim 1, wherein the target string is a truncated target string, wherein the truncated target string is only as long as a shortest one of a plurality of target strings.

5. The method of claim 1, wherein the action is an identification of the data set as a suspect data set.

6. The method of claim 1, wherein the scanning program is attempting to identify the data set as unwanted content.

7. The method of claim 6, wherein the unwanted content is malware.

8. The method of claim 1, wherein the scanning program is attempting to identify data being transmitted in violation of a confidentiality policy.

9. The method of claim 1, wherein the data set is in the form of streaming data that is to be analyzed.

10. The method of claim 1, wherein the data set is data stored in a database.

11. A computer program product comprising computer executable code embodied in a non-transitory computer readable medium that, when executing on one or more computing devices, performs the steps of:
    receiving a plurality of target pattern strings, wherein the target pattern strings are composed of at least one target pattern string character;

creating a bitmap matrix that maps a location of target pattern string character pairs in each of the plurality of target pattern strings;

presenting a data set for target pattern string searching;

performing a target pattern string search on the data set, where the target pattern string search utilizes the bitmap matrix to identify target pattern string matches within the data set, and wherein the target pattern string search utilizes a minimum target pattern string length; and reporting instances where a positive target pattern string match occurs.

12. The computer program product of claim 11, wherein the positive target pattern string match is a match between at least one of the plurality of target pattern strings and a string in the data set.

13. The computer program product of claim 11, wherein the minimum target pattern string length is used to generate a truncated target pattern string by truncating the target pattern string to the minimum target pattern string length.

14. The computer program product of claim 13, wherein the truncated target pattern string list is mapped to the plurality of target pattern strings.

15. The computer program product of claim 11, wherein the target pattern string search utilizes a search pattern utilizing the bitmap matrix and a code vector, where a bitmask represents the location of target pattern character pairs associated with each possible pair combination of target pattern string characters.

16. The computer program product of claim 15, wherein the code vector maps at least one of the target pattern string characters of at least one of the plurality of target pattern strings to an assigned value.

17. The computer program product of claim 11, wherein the search pattern compares a found text string of the search length within the data set, which has been found to match both core vectors for all characters within the search string and bitmask pair positions for all character pairs within the found search string, and the plurality of target search strings for a positive match.

18. The computer program product of claim 11 wherein the location of target pattern string character pairs is a distance from an end of a corresponding one of the plurality of target pattern strings.

* * * * *